(12) United States Patent
Mizuno et al.

(10) Patent No.: US 11,476,635 B2
(45) Date of Patent: Oct. 18, 2022

(54) OPTICALLY AMPLIFIED REPEATER SYSTEM AND OPTICAL AMPLIFIER

(71) Applicant: NIPPON TELEGRAPH AND TELEPHONE CORPORATION, Tokyo (JP)

(72) Inventors: Takayuki Mizuno, Yokosuka (JP); Akira Isoda, Yokosuka (JP); Kohki Shibahara, Yokosuka (JP); Mitsunori Fukutoku, Yokosuka (JP); Yutaka Miyamoto, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 283 days.

(21) Appl. No.: 16/640,242

(22) PCT Filed: Aug. 24, 2018

(86) PCT No.: PCT/JP2018/031355
§ 371 (c)(1),
(2) Date: Feb. 19, 2020

(87) PCT Pub. No.: WO2019/039590
PCT Pub. Date: Feb. 28, 2019

(65) Prior Publication Data
US 2020/0381888 A1    Dec. 3, 2020

(30) Foreign Application Priority Data
Aug. 25, 2017  (JP) .............................. JP2017-162837

(51) Int. Cl.
*H01S 3/23* (2006.01)
*H01S 3/067* (2006.01)
(Continued)

(52) U.S. Cl.
CPC ........ *H01S 3/2308* (2013.01); *H01S 3/06708* (2013.01); *H01S 3/06754* (2013.01);
(Continued)

(58) Field of Classification Search
CPC .... H01S 3/302; H01S 3/2383; H04B 10/2537
See application file for complete search history.

(56) References Cited

U.S. PATENT DOCUMENTS 9,250,385 B1 *   2/2016   Onaka ................. H01S 3/06754
2002/0105715 A1 * 8/2002   Naito ...................... H01S 3/302
                                                         359/341.33
(Continued)

FOREIGN PATENT DOCUMENTS

JP    H06-053586 A    2/1994
JP    2000314902 A   11/2000
(Continued)

OTHER PUBLICATIONS

Kitamura et al. "Cross-talk characteristics of a hybrid multi-core fiber transmission system using distributed raman amplification", 2013 18th OptoElectronics and Communications Conference held jointly with 2013 International Conference on Photonics in Switching (OECC/PS) (Year: 2013).*

(Continued)

*Primary Examiner* — Eric L Bolda
(74) *Attorney, Agent, or Firm* — Harness, Dickey & Pierce, P.L.C.

(57) ABSTRACT

An optically amplified repeater system includes optical transmission paths, a multi-channel optical amplifier, one or more Raman amplification pumping light sources, and a wavelength multiplexer. The multi-channel optical amplifier includes K simultaneous pumping light sources, N optical amplification media, and one or more optical couplers, and simultaneously amplifies, with the K simultaneous pumping
(Continued)

light sources, light intensities of optical signals that pass through the N optical amplification media and propagate through the optical transmission paths. Light intensities of the wavelength band of the optical signals is Raman amplified by the Raman amplification pumping light. A light intensity of the Raman amplification pumping light output from the one or more Raman amplification pumping light sources is determined in accordance with characteristic differences between the optical signals passing through the optical transmission paths.

11 Claims, 21 Drawing Sheets

(51) Int. Cl.
  *H01S 3/094* (2006.01)
  *H01S 3/0941* (2006.01)
  *H01S 3/30* (2006.01)
  *H04B 10/297* (2013.01)
  *H01S 3/16* (2006.01)

(52) U.S. Cl.
  CPC .... *H01S 3/09415* (2013.01); *H01S 3/094003* (2013.01); *H01S 3/094069* (2013.01); *H01S 3/1608* (2013.01); *H01S 3/2383* (2013.01); *H01S 3/302* (2013.01); *H04B 10/297* (2013.01)

(56) References Cited

U.S. PATENT DOCUMENTS

| | | | |
|---|---|---|---|
| 2002/0105716 A1 | 8/2002 | Tanaka et al. | |
| 2002/0167716 A1 | 11/2002 | Yamanaka | |
| 2010/0129081 A1 | 5/2010 | Onaka | |
| 2011/0279888 A1* | 11/2011 | Fini | H01S 3/06737 359/334 |
| 2012/0170111 A1* | 7/2012 | Doerr | G02B 6/4204 264/1.25 |
| 2012/0294607 A1* | 11/2012 | Winzer | H04B 10/2912 359/341.1 |
| 2013/0063809 A1* | 3/2013 | Nishihara | H01S 3/06737 359/341.2 |
| 2013/0121693 A1 | 5/2013 | Tanaka et al. | |
| 2015/0085352 A1* | 3/2015 | Ryf | H01S 3/06737 359/341.1 |

FOREIGN PATENT DOCUMENTS

| | | |
|---|---|---|
| JP | 2002232362 A | 8/2002 |
| JP | 2002344054 A | 11/2002 |
| JP | 2010122548 A | 6/2010 |
| JP | 2013106272 A | 5/2013 |
| JP | 2016219753 A | 12/2016 |

OTHER PUBLICATIONS

H. Ono et al., "Amplification method for crosstalk reduction in multi-core fibre amplifier", Electronics Letters, Jan. 2013, vol. 49, No. 2.
A. Sano et al., "409-Tb/s + 409-Tb/s crosstalk suppressed bidirectional MCF transmission over 450 km using propagation-direction interleaving", Optics Express, Jul. 2013, vol. 21, No. 14.
H. Ono et al., "12-Core Double-Clad Er/Yb-Doped Fiber Amplifier Employing Free-space Coupling Pump/Signal Combiner Module", ECOC2013, 2013, We.4.A.4.
S. Takasaka et al., "Cladding-Pumped Seven-Core EDFA Using a Multimode Pump Light Coupler", ECOC2013, 2013, We.4.A.5.
K. Takeshima et al., "51.1-Tbit/s MCF Transmission over 2,520 km Using Cladding Pumped 7-core EDFAs", OFC2015, 2015, W3G.1.
C. Castro et al., "200 Gbit/s 16QAM WDM Transmission over a Fully Integrated Cladding Pumped 7-Core MCF System", OFC2017, 2017, Th1C.2.
S. Jain et al., "32-core Inline Multicore Fiber Amplifier for Dense Space Division Multiplexed Transmission Systems", ECOC2016, 2016, Th.3.A.1.
A. Turukhin et al., "105.1 Tb/s Power-Efficient Transmission over 14,350 km using a 12-Core Fiber", OFC2016, 2016, Th4C.1.
M. Yamada et al., "Gain Control in Multi-Core Erbium/Ytterbium-Doped Fiber Amplifier with Hybrid Pumping", OECC/PS2016, 2016, WC1-2.
E. de Gabory et al., "Transmission of 256Gb/s PM-16QAM Signal through Hybrid Cladding and Core Pumping Scheme MC-EDFA Controlled for Reduced Power Consumption", OFC2017, 2017, Th1C.1.
Mizuno Takayuki et al., Hybrid Cladding-pumped EDFA/Raman for SDM Transmission Systems Using Core-by-core Gain Control Scheme, 2017 European Conference on Optical Communication (ECOC) Sep. 2017.
International Search Report (in English and Japanese) issued in PCT/JP2018/031355, dated Oct. 16, 2018.
Jia, Dagong et al., "Optical Fiber Amplifiers for Space-Division Multiplexing", (Front Optoelectron), 2012, pp. 351-357.

* cited by examiner

OPTICALLY AMPLIFIED REPEATER SYSTEM AND OPTICAL AMPLIFIER

CROSS-REFERENCE TO RELATED APPLICATIONS

This application is a 371 National Stage of International Application No. PCT/JP2018/031355, filed on Aug. 24, 2018, which claims priority to Japanese Application No. 2017-162837, filed on Aug. 25, 2017. The entire disclosures of the above applications are incorporated herein by reference.

TECHNICAL FIELD

The present invention relates to an optically amplified repeater system and an optical amplifier.

BACKGROUND ART

Broadband services have been developing rapidly with accompanying the wide use of optical fiber communication in recent years, and communication capacity has been continuously increasing every year. Implementation of a large capacity optical network has previously been realized by increasing the capacity of optical communication system apparatus without changing the structure of optical fibers, in order to satisfy the rapidly increasing demand for communication capacity. An optical fiber that serves as a base of a current large-capacity optical network has one core that serves as a path of an optical signal, and an optical network transmitting a capacity of one terabit per second over a long distance is practically used. Since the increasing rate of communication capacity is still high, it is desirable to newly implement a large communication capacity.

Increasing the number of optical fiber transmission paths may be considered as a means for increasing communication capacity. When an optical signal is transmitted from an optical transmitter side to an optical receiver side, the transmission capacity can be increased N-fold by increasing one optical fiber to N optical fibers. Alternatively, as another means, a space-division multiplexing optical communication technology has been studied in recent years, and the technology uses an optical fiber having a new spatial structure including a multicore optical fiber having a plurality of single-mode cores in one optical fiber. The capacity that can be transmitted by one optical fiber can be increased N-fold by using one optical fiber having N cores.

When an optical signal propagates in an optical fiber, the light intensity is weakened in proportion to a propagation distance, and the signal quality deteriorates. Accordingly, it is necessary to amplify the light intensity every predetermined distance. Since a typical propagation loss of an optical fiber that is currently used is about 0.2 dB per 1 km, the light intensity reduces by half every 10 km of propagation. Thus, an optically amplified repeater system has optical amplifiers installed at an intervals of several tens of km such that the light intensity is above a predetermined value at which the signal quality can be maintained. As described above, in order to increase the number of optical fibers or the number of cores in an optical fiber used in an optical transmission path, it is also necessary to increase the capacity of an optically amplified repeater system. However, if the number of optical paths is increased by N-fold, the number of optical amplifiers needed will also increase by N times. This will result in cost increases due to purchasing of optical amplifiers, preparation of spaces to install the equipment, and an increase in power consumption, and the like. Thus, a large-capacity optically amplified repeater system and an optical amplifier capable of amplifying light of a plurality of optical paths together is being studied.

(First Example of Conventional Technology)

A conventional single-mode optical transmission system uses as an optical amplifier an erbium-doped fiber amplifier (EDFA) in which an erbium-doped fiber (EDF) is used as an amplification medium. In accordance with an increase in the capacity of the optically amplified repeater system, the number of required optical amplifiers increases, and accordingly, it is required to implement a high density of optical amplifiers and a decrease in the power consumption. Thus, a multicore erbium-doped fiber amplifier (multicore (MC)-EDFA) that uses a multicore EDF having N cores doped with erbium in one optical fiber as an amplification medium or uses N EDFs as a bundle amplification medium has been studied.

Conventionally, in the MC-EDFA, there are two pumping systems, i.e., an individual pumping system and a simultaneous pumping system. The individual pumping system uses pumping light sources that differ for each amplification medium, and the simultaneous pumping uses one pumping light source exciting a plurality of amplification media. As one example of the individual pumping system, there is a core-pumping system. A core pumping system directly excites cores by multiplexing pumping light in each core of an amplification medium. Since a difference from a conventional EDFA is that N times as many EDF units are integrated, there is an advantage that components and control for an existing EDF can be used. For example, a 6-core MC-EDFA (for example, see Non-Patent Document 1) that directly excites cores by multiplexing six pumping light sources of 0.98 µm in each core using six cores disposed on the outer circumference in a 7-core MC-EDF (multicore EDF) as optical amplification media and a 12 multicore optical fiber transmission experiment (for example, see Non-Patent Document 2) using two 6-core MC-EDFAs described above have been reported.

A cladding pumping system is a representative example of the simultaneous pumping system. The cladding pumping system uses a pumping light propagating through a cladding that is an amplification medium, and a plurality of cores are excited together using the pumping light propagating through the cladding. In this system, temperature control is not required, an inexpensive high-output multi-mode semiconductor laser can be used as a pumping light source, and a plurality of EDFs can be excited by one light source. For this reason, the number of pumping light sources can be reduced, and the power consumption can be reduced. Thus, research and development on this as a prospective amplification technology in future optically amplified repeater systems have been in progress.

A multi-channel optical amplifier (for example, see Non-Patent Document 3) of simultaneous pumping using a multicore erbium/ytterbium-doped fiber (MC-EYDF) having a double cladding structure of 12 cores and a multi-channel optical amplifier of simultaneous pumping using an MC-EDF having a double cladding structure of seven cores (for example, Non-Patent Document 4) have been reported. In addition, an experiment of a transmission of a multicore optical fiber of seven cores using a 7-core simultaneous pumping MC-EDFA (for example, see Non-Patent Document 5) has been reported.

As another example, an optical transmission path (for example, see Non-Patent Document 6) in which seven optical paths of a multi-channel optical amplifier, a multicore optical fiber formed of seven cores, and seven optical paths of the multi-channel optical amplifier are interconnected to be optically coupled and an optical transmission path (for example, see Non-Patent Document 7) in which a multicore optical fiber formed from 32 cores, 32 optical paths of a multi-channel optical amplifier, and a multicore optical fiber of 32 cores are interconnected to be optically coupled have also been reported.

In addition, a simultaneous pumping-multicore EDFA of a core pumping system, in which a plurality of EDFs are used as amplification media and one pumping light source is commonly used, have also been reported in recent years. For example, Non-Patent Document 8 shows an optical amplification in which N=12 EDFs are used as amplification medium, and N=12 EDFs are amplified simultaneously using one excitation light source of 980 nm. Similar to the cladding pumping system described above, temperature control is not required, an inexpensive high-output multimode semiconductor laser can be used as a pumping light source, and a plurality of EDFs can be excited using one light source, whereby the number of pumping light sources can be decreased, and the power consumption can be reduced.

(Second Example of Conventional Technology)

The optical amplifier of simultaneous pumping and the optical amplification repeating transmission path described in the first example of the conventional technology, by using any K=1 (Non-Patent Documents 3 to 6 and 8) multimode laser diode (MM-LD) or K=2 (Non-Patent Document 7) multimode excitation laser diodes (multimode pump laser diodes (MM pump LDs), excite an EDF formed from N=7 (Non-Patent Documents 4 to 6), N=12 (Non-Patent Documents 3 and 8), or N=32 (Non-Patent Document 7) amplification media to amplify the light intensities of optical paths passing through N optical amplification media together.

In this way, the simultaneous pumping system that all the N cores are excited simultaneously can uniformly amplify the optical intensities of cores when characteristics of a plurality of optical transmission paths are uniform. However, when characteristic differences occur between optical transmission paths due to a loss in an optical transmission path, optical signal to noise ratios (OSNR), amplification factors of optical amplifiers, modulation formats of optical signals, the number of wavelength channels of an optical signal, and the like, there is a problem in that light intensities of the cores cannot be uniformly amplified. For example, in optical fibers, optical components, optical amplifiers, and the like of a multicore, a loss deviation occurs in accordance with a performance difference of the cores. As one example, in an MC-EDFA having 32 cores described in Non-Patent Document 7, a gain difference of 7 to 8 dB occurs among 32 cores. In addition, in a multicore optical fiber, at the time of welding connection, a loss distribution occurs in accordance with an optical axis deviation in the plane direction and a rotation axis deviation, and a loss deviation occurs for each core. In addition, in a multicore optical transmission path, in a case in which a plurality of optical signals come from different paths, transmission losses of optical transmission paths are different from each other, and a light intensity is different for each core in accordance with a setting of optical power, a difference in the number of wavelengths, and the like.

At the time of optical transmission, in order to maintain transmission quality, it is necessary for input power for an optical fiber to be within a predetermined range. Furthermore, in a case in which there are a plurality of optical transmission paths, it is necessary to align optical power levels among N cores. Thus, by using a core that has a high loss or a low gain and has the lowest light intensity as a reference, the optical intensities are uniformly amplified such that the optical power level of the core is above a predetermined optical power level. In a case in which the optical intensities are uniformly amplified, optical intensities of the other cores become excessive by amounts corresponding to deviations of the optical intensities of the cores, and accordingly, weakening the optical intensities using an optical attenuator, a waveform shaping optical filter, or the like may be considered. By using such a technique, deviations between optical intensities of cores at which a multi-channel optical amplifier of simultaneous pumping is used can be reduced.

(Third Example of Conventional Technology)

In a case in which a multi-channel optical amplifier of simultaneous pumping is used using the pumping system described in the second example of the conventional technology, while a deviation between optical intensities of cores can be reduced, there is a problem in that the power consumption increases. For example, in a case in which there is a loss deviation of 7 dB among a plurality of optical paths, it is necessary to amplify the optical intensities simultaneously using the multi-channel optical amplifier such that a core having the lowest power level reaches a predetermined intensity. Since the optical power level of a core having the highest optical power level becomes excessive by about 7 dB, light of about 7 dB is attenuated, in other words, 80% of light is discarded, which is inefficient.

Thus, as an optical amplification system reducing deviations between optical intensities of cores while reducing power consumption, a hybrid optical amplifier combining simultaneous pumping and individual pumping has also been studied. In a hybrid system, light of N channels is excited simultaneously using an MC-EDFA of cladding pumping, and then N cores are individually excited using an MC-EDFA of core pumping. There is an advantage that light is efficiently pumped using a cladding pumping system in an earlier stage, and a gain according to pumping can be adjusted for each core using a core pumping system of a later stage.

In order to realize a hybrid optical amplifier, it may be considered to use a total of two MC-EDFAs including an EDFA of the cladding pumping system and an EDFA of the core pumping system. Alternatively, an optical amplifier having a configuration including both the cladding pumping system and the core pumping system in one MC-EDFA has also been reported (for example, see Non-Patent Document 9 and Patent Document 1). In such an optical amplifier, one multicore EDF which has a double cladding structure and to which rare-earth ions are doped is used as an optical amplification medium. Cladding pumping is performed by optically coupling light for cladding pumping of multiple modes at one end of the multicore EDF, and core pumping is performed on each core of the multicore EDF by optically coupling light for core pumping at the other end. In addition, a hybrid excitation MC-EDFA that improves efficiency by changing an pumping ratio between the cladding pumping system and the core pumping system in accordance with the temperature of a casing of the optical amplifier has also been reported (for example, Non-Patent Document 10).

CITATION LIST

Patent Document

[Patent Document 1]
Japanese Unexamined Patent Application, First Publication No. 2016-219753

Non Patent Document

[Non-Patent Document 1]
H. Ono et al., "Amplification method for crosstalk reduction in multicore fibre amplifier," Electronics Letters, January 2013, Vol. 49, No. 2

[Non-Patent Document 2]
A. Sano et al. "409-Tb/s+409-Tb/s crosstalk suppressed bidirectional MCF transmission over 450 km using propagation-direction interleaving," Optics Express, July 2013, Vol. 21, No. 14

[Non-Patent Document 3]
H. Ono et al., "12-Core Double-Clad Er/Yb-Doped Fiber Amplifier Employing Free-space Coupling Pump/Signal Combiner Module," ECOC2013, 2013, We.4.A.4

[Non-Patent Document 4]
S. Takasaka et al., "Cladding-Pumped Seven-Core EDFA Using a Multimode Pump Light Coupler," ECOC2013, 2013, We.4.A.5

[Non-Patent Document 5]
K. Takeshima et al., "51.1-Tbit/s MCF Transmission over 2,520 km Using Cladding Pumped 7-core EDFAs," OFC2015, 2015, W3G. 1

[Non-Patent Document 6]
C. Castro et al., "200 Gbit/s 16QAM WDM Transmission over a Fully Integrated Cladding Pumped 7-Core MCF System," OFC2017, 2017, Th1C.2

[Non-Patent Document 7]
S. Jain et al., "32-core Inline Multicore Fiber Amplifier for Dense Space Division Multiplexed Transmission Systems," ECOC2016, 2016, Th.3.A.1

[Non-Patent Document 8]
A. Turukhin et al., "105.1 Tb/s Power-Efficient Transmission over 14,350 km using a 12-Core Fiber," OFC2016, 2016, Th4C.1

[Non-Patent Document 9]
M. Yamada et al., "Gain Control in Multicore Erbium/Ytterbium-Doped Fiber Amplifier with Hybrid Pumping," OECC/PS2016, 2016, WC1-2

[Non-Patent Document 10]
E. de Gabory et al., "Transmission of 256 Gb/s PM-16QAM Signal through Hybrid Cladding and Core Pumping Scheme MC-EDFA Controlled for Reduced Power Consumption," OFC2017, 2017, Th1C.1

SUMMARY OF INVENTION

Technical Problem

However, there are the following problems in the conventional technologies.

As shown in the first example of the conventional technology, by using an optical amplifier of simultaneous pumping, an optically amplified repeater system that is appropriate for implementation of a large capacity can be realized. However, in the simultaneous pumping system, while the efficiency is high in a case in which all the N cores are excited, there are also cores that are not used in accordance with communication traffic in a multicore optical fiber transmission path. Depending on a ratio between used and unused cores among N cores, it may be inefficient in view of power consumption compared to the individual excitation system.

In addition, in the simultaneous pumping system, a plurality of channels are uniformly amplified, and accordingly, in a case in which there are characteristic deviations among a plurality of optical transmission paths, deviations among cores occur also in the optical amplification characteristics. As shown in the second example, by excessively pumping light of a plurality of optical transmission paths temporarily and attenuating light in accordance with deviations among the cores, the deviations among the cores can be adjusted. However, in a case in which light is attenuated, the power consumption increases, and pumping efficiency becomes low depending on a degree of the deviations.

As shown in the third example of the conventional technology, by using the hybrid system combining the core pumping and the cladding pumping, efficient amplification and adjustment of a gain for each core can be performed. However, since light is amplified after transmission, the transmission characteristics are regulated by an OSNR of a core having a high loss.

In view of the situations described above, an object of the present invention is to provide an optically amplified repeater system and an optical amplifier that reduce characteristic deviations among a plurality of optical transmission paths and have high efficiency.

Solution to Problem

According to a first aspect of the present invention, there is provided an optically amplified repeater system including: optical transmission paths that include optical fibers; a multi-channel optical amplifier comprising K simultaneous pumping light sources, N optical amplification media, and one or more optical couplers coupling light output from the K simultaneous pumping light sources to the N optical amplification media, K being an integer equal to or larger than "1", N being an integer satisfying relation N>K, wherein with the K simultaneous pumping light sources, the multi-channel optical amplifier simultaneously amplifies light intensities of optical signals that pass through the N optical amplification media and propagate through the optical transmission paths; one or more Raman amplification pumping light sources that output Raman amplification pumping light having a wavelength different from a wavelength band of the optical signals; and a wavelength multiplexer that multiplexes the Raman amplification pumping light having a wavelength different from the wavelength band of the optical signals into at least one optical transmission path among the optical transmission paths. Light intensities of the wavelength band of the optical signals is Raman amplified by the Raman amplification pumping light. A light intensity of the Raman amplification pumping light output from the one or more Raman amplification pumping light sources is determined in accordance with characteristic differences between the optical signals passing through the optical transmission paths.

According to a second aspect of the present invention, in the optically amplified repeater system according to the first aspect, the optical transmission paths comprise a multicore optical fiber having a plurality of cores.

According to a third aspect of the present invention, in the optically amplified repeater system according to the second aspect, the wavelength multiplexer multiplexes the Raman amplification pumping light having a wavelength different from the wavelength band of the optical signals into each of the plurality of cores of the multicore optical fiber. The multicore optical fiber, the wavelength multiplexer, and N optical paths of the multi-channel optical amplifier are interconnected so as to be optically coupled.

A fourth aspect of the present invention, in the optically amplified repeater system according to the second or third aspect, further comprising an optical tap that branches the optical signals propagating through the optical transmission paths. The light intensity of the Raman amplification pumping light output from the one or more Raman amplification pumping light sources is determined in accordance with light intensities of the optical signals branched by the optical tap.

A fifth aspect of the present invention, in the optically amplified repeater system according to the first aspect, the optical transmission paths include N optical fibers, and each of the N optical fibers is equipped with an optical tap that branches the optical signals propagating through the optical transmission paths. The light intensity of the Raman amplification pumping light output from the one or more Raman amplification pumping light sources is determined in accordance with light intensities of the optical signals branched by the optical taps.

A sixth aspect of the present invention, in the optically amplified repeater system according to any one of the first to fifth aspects, further comprising an amplifier including: the multi-channel optical amplifier; the wavelength multiplexer; the one or more Raman amplification pumping light sources; at least N input ports connected to the optical transmission paths; and at least N output ports outputting the optical signals amplified by the multi-channel optical amplifier.

A seventh aspect of the present invention, in the optically amplified repeater system according to any one of the first to fifth aspects, further comprising an amplifier including: the multi-channel optical amplifier; the wavelength multiplexer; the one or more Raman amplification pumping light sources; an input port having at least N cores connected to the optical transmission paths; and an output port having at least N cores outputting the optical signals amplified by the multi-channel optical amplifier.

An eighth aspect of the present invention, in the optically amplified repeater system according to any one of the first to fifth aspects, further includes at least one of:

an optical amplifier including the multi-channel optical amplifier and the wavelength multiplexer; a first amplifier including the multi-channel optical amplifier, the wavelength multiplexer, the one or more Raman amplification pumping light sources, at least N input ports connected to the optical transmission paths, and at least N output ports outputting the optical signals amplified by the multi-channel optical amplifier; and a second amplifier including the multi-channel optical amplifier, the wavelength multiplexer, the one or more Raman amplification pumping light sources, an input port having at least N cores connected to the optical transmission paths, and an output port having at least N cores outputting the optical signals amplified by the multi-channel optical amplifier.

According to a ninth aspect of the present invention, there is provided an optical amplifier connecting to optical transmission paths that include optical fibers, the optical amplifier including: a multi-channel optical amplifier that simultaneously amplifies light intensities of optical signals propagating through the optical transmission paths; one or more Raman amplification pumping light sources that output Raman amplification pumping light having a wavelength other than a wavelength band of the optical signals; and a wavelength multiplexer that multiplexes the Raman amplification pumping light into at least one optical transmission path among the optical transmission paths. A light intensity of a wavelength band of an optical signal is Raman amplified by the Raman amplification pumping light, the optical signal being propagated through at least one optical transmission path in which the Raman amplification pumping light is multiplexed. The one or more Raman amplification pumping light sources output the Raman amplification pumping light having light intensity in accordance with characteristic differences between the optical signals passing through the optical transmission paths.

According to a tenth aspect of the present invention, there is provided an optical amplifier connecting to optical transmission paths that include optical fibers, and which connects to a multi-channel optical amplifier that simultaneously amplifies light intensities of optical signals propagating through the optical transmission paths, the optical amplifier including: one or more Raman amplification pumping light sources that output Raman amplification pumping light having a wavelength other than a wavelength band of the optical signals; and a wavelength multiplexer that multiplexes the Raman amplification pumping light into at least one optical transmission path among the optical transmission paths. A light intensity of a wavelength band of an optical signal is Raman amplified by the Raman amplification pumping light, the optical signal being propagated through at least one optical transmission path in which the Raman amplification pumping light is multiplexed. The one or more Raman amplification pumping light sources output the Raman amplification pumping light having light intensity in accordance with characteristic differences between the optical signals passing through the optical transmission paths.

Advantageous Effects of Invention

According to the present invention, an optically amplified repeater system and an optical amplifier that reduce characteristic deviations among a plurality of optical transmission paths and have high efficiency can be realized.

DESCRIPTION OF EMBODIMENTS

Figure 1:
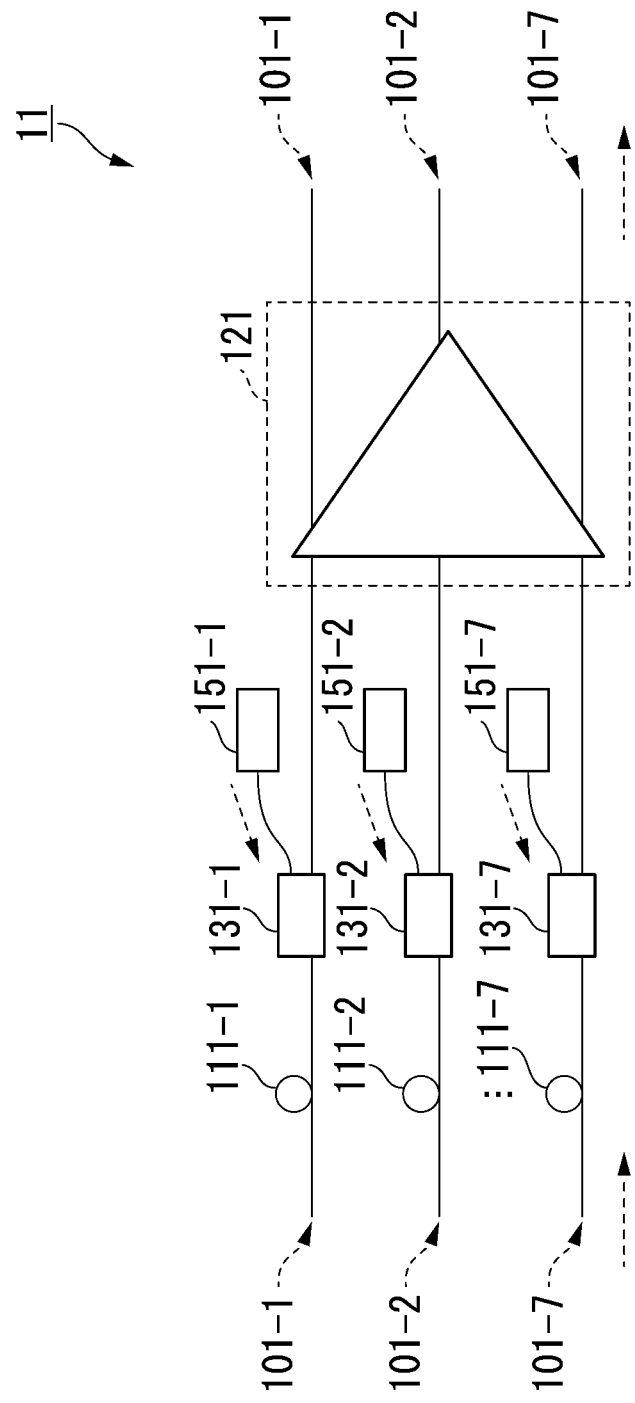
FIG. 1 is a schematic configuration diagram of a large-capacity optically amplified repeater system according to a first embodiment.

Hereinafter, embodiments of the present invention will be described in detail with reference to the drawings. Each embodiment described below is an example of the present invention, and the present invention is not limited to the following embodiments. In addition, in this specification and the drawings, the same reference numerals are assigned to components having the same function, and repeated description thereof will be omitted. The embodiments can be combined whenever possible. In addition, hereinafter, in a case in which there are Y functional units XXX, the Y functional units XXX will be referred to as functional units XXX-1 to XXX-Y.

First Embodiment

FIG. 1 is a schematic configuration diagram of a large-capacity optically amplified repeater system 11 according to a first embodiment. The large-capacity optically amplified repeater system 11 includes optical transmission paths 101-1 to 101-N (here, N is an integer of "1" or more) including respective optical fibers 111-1 to 111-N, a multi-channel optical amplifier 121, wavelength multiplexers 131-1 to 131-N, and Raman amplification pumping light sources 151-1 to 151-N. FIG. 1 shows a case of N=7 as an example.

The multi-channel optical amplifier 121 amplifies light intensities of a band including an optical signal band (wavelength band) of light propagating through the optical transmission paths 101-1 to 101-N. The wavelength multiplexers 131-1 to 131-N multiplex light of a wavelength different from the wavelength band of the optical signal into at least one optical path of a plurality of optical transmission paths 101-1 to 101-N. The Raman amplification pumping light sources 151-1 to 151-N are Raman pumping light sources. The wavelength multiplexer 131-$n$ (here, n is an integer that is equal to or larger than "1" and is equal to or smaller than N) Raman amplifies the intensity of light of a wavelength band of an optical signal in the optical transmission path 101-$n$ by inputting Raman amplification pumping light from the Raman amplification pumping light source 151-$n$ to the optical transmission path 101-$n$. Each of the Raman amplification pumping light sources 151-1 to 151-N may be configured by a plurality of light sources. For example, the light obtained by performing polarization multiplexing of light of two light sources may be used as Raman amplification pumping light sources. In addition, the light obtained by performing waveform multiplexing of light of a plurality of light sources of which wavelengths are different from each other may be used as Raman amplification pumping light sources.

Figure 2:
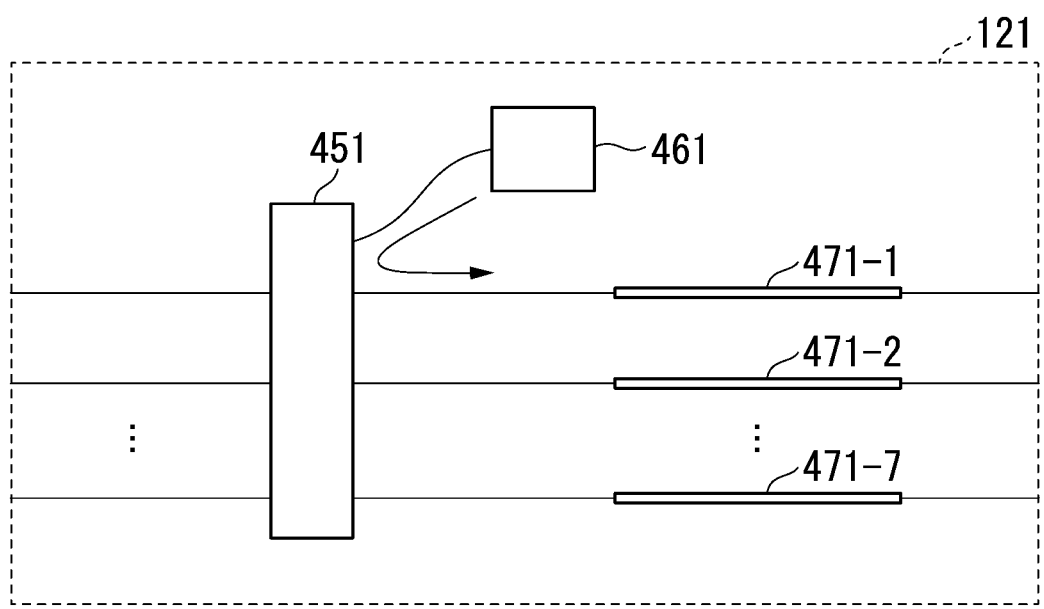
FIG. 2 is a configuration diagram of a multi-channel optical amplifier according to the first embodiment.

FIG. 2 shows a schematic configuration diagram of the multi-channel optical amplifier 121. The multi-channel optical amplifier 121 includes an optical coupler 451, K (here, K is an integer that is equal to or larger than "1"; N>K) simultaneous pumping light sources 461, and N optical amplification media 471-1 to 471-N. FIG. 2 shows a case of K=1 and N=7 as an example. Light of the optical transmission path 101-$n$ passes through an optical path of an optical amplification medium 471-$n$ (here, n is an integer that is equal to or larger than "1" and is equal to or smaller than N). The optical coupler 451 optically couples the pumping light generated from the simultaneous pumping light source 461 onto optical paths of optical amplification media 471-1 to 471-N. By employing such a configuration, optical intensities of optical paths passing through the optical amplification media 471-1 to 471-N are amplified simultaneously in accordance with pumping light from the simultaneous pumping light source 461. As one example, a multi-mode laser diode is used as the simultaneous pumping light source 461, and erbium-doped optical fibers are used as the optical amplification media 471-1 to 471-N (see Non-Patent Document 3).

Figure 3A:
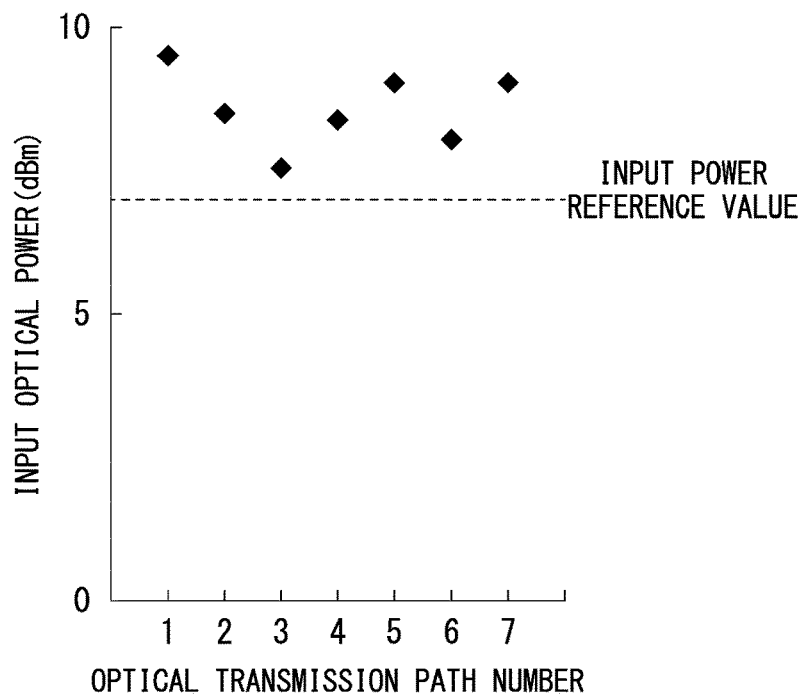
FIG. 3A is a diagram showing characteristics of a large-capacity optically amplified repeater system according to the first embodiment.
Figure 3B:
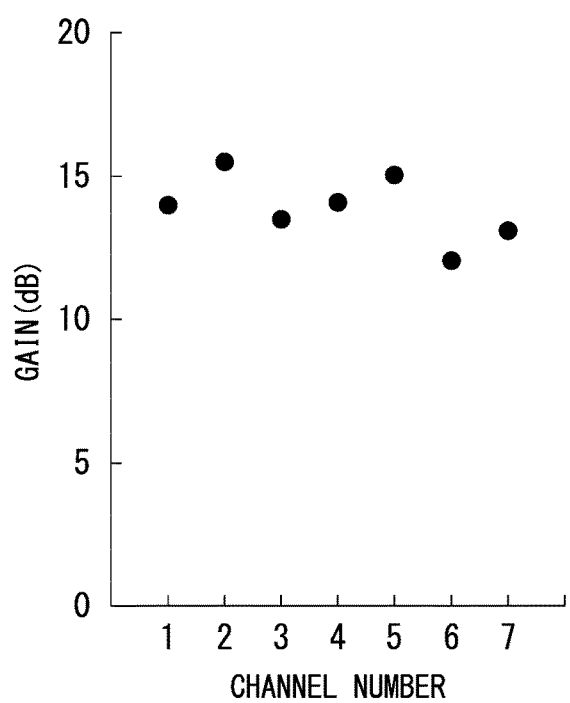
FIG. 3B is a diagram showing characteristics of a large-capacity optically amplified repeater system according to the first embodiment.

FIGS. 3A and 3B are diagrams showing the characteristics of the large-capacity optically amplified repeater system 11. FIG. 3A shows one example of light power of input signals input to the optical transmission paths 101-1 to 101-7 in the large-capacity optically amplified repeater system 11. As shown in FIG. 3A, optical transmission path numbers 1 to 7 correspond to optical transmission paths 101-1 to 101-7, respectively. In the first embodiment, an input signal is set as a 40 WDM polarization-multiplexed 16 QAM signal obtained by performing wavelength division multiplexing (WDM) of 40 wavelength channels at 100 GHz spacing, performing polarization multiplexing and modulating the signal using a 16 QAM format. An input power level varies between 7.5 and 9.5 dBm (between −8.5 and −6.5 dBm/ch per wavelength) among the optical transmission paths and is 8.5 dBm (−7.5 dBm/ch per wavelength) on average.

FIG. 3B shows the gain characteristics of multi-channel optical amplifier 121 according to the first embodiment. The multi-channel optical amplifier 121, as shown in FIG. 2, is a multicore optical amplifier of simultaneous pumping. A 40 WDM polarization-multiplexed 16 QAM signal of which an optical power level is set to −5 dBm is input to each port of the multi-channel optical amplifier 121, an optical power level after amplification is measured, and a difference between the optical power levels before and after amplification is calculated as a gain. Channel numbers 1 to 7 correspond to respective ports into which light of the optical transmission path numbers 1 to 7 is inserted. The gain varies between 12 and 15.5 dB among the ports and is 14 dB on average.

In this way, the optical power levels of a plurality of optical transmission paths are likewise not uniform at input points, and characteristic deviations between optical transmission paths increase in accordance with a gain difference between ports of the multi-channel optical amplifier 121. In addition, an input signal also passes through optical fibers, light connectors, light branches, and the like having different loss characteristics on each optical transmission path. For this reason, characteristic deviations further increase in accordance with characteristic deviations of these optical transmission media and optical components.

Figure 4A:
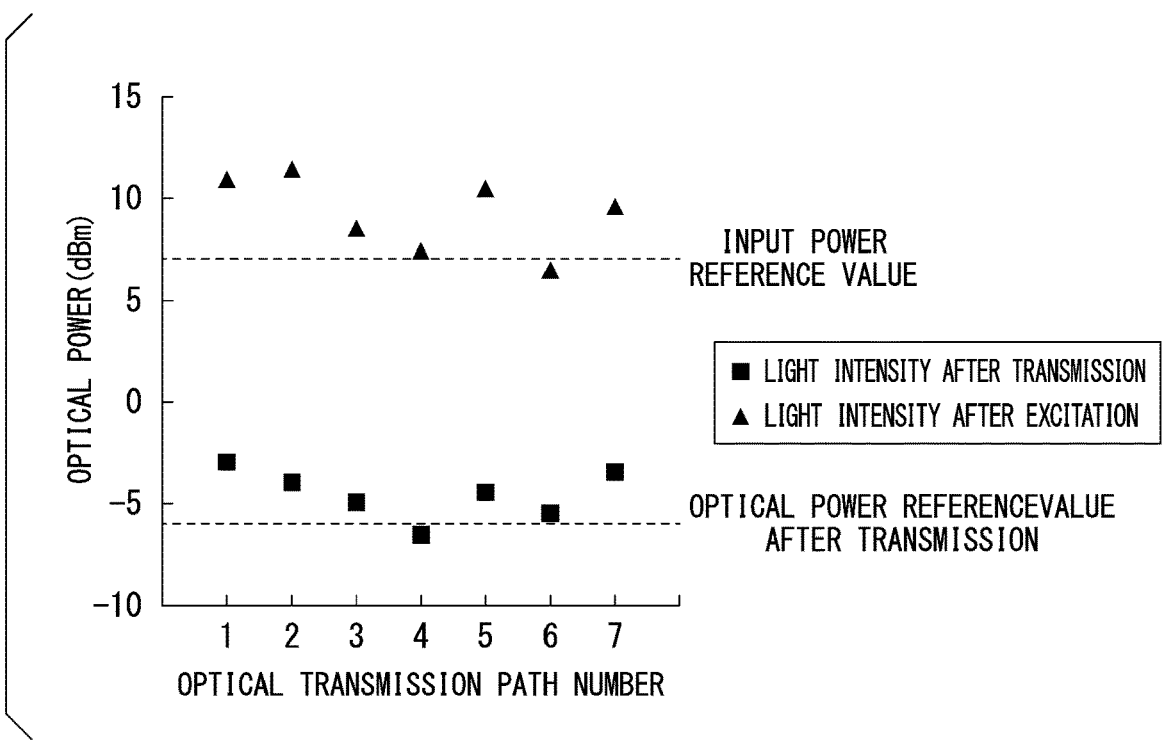
FIG. 4A is a diagram showing optical power levels of an optical signal before application of the first embodiment.
Figure 4B:
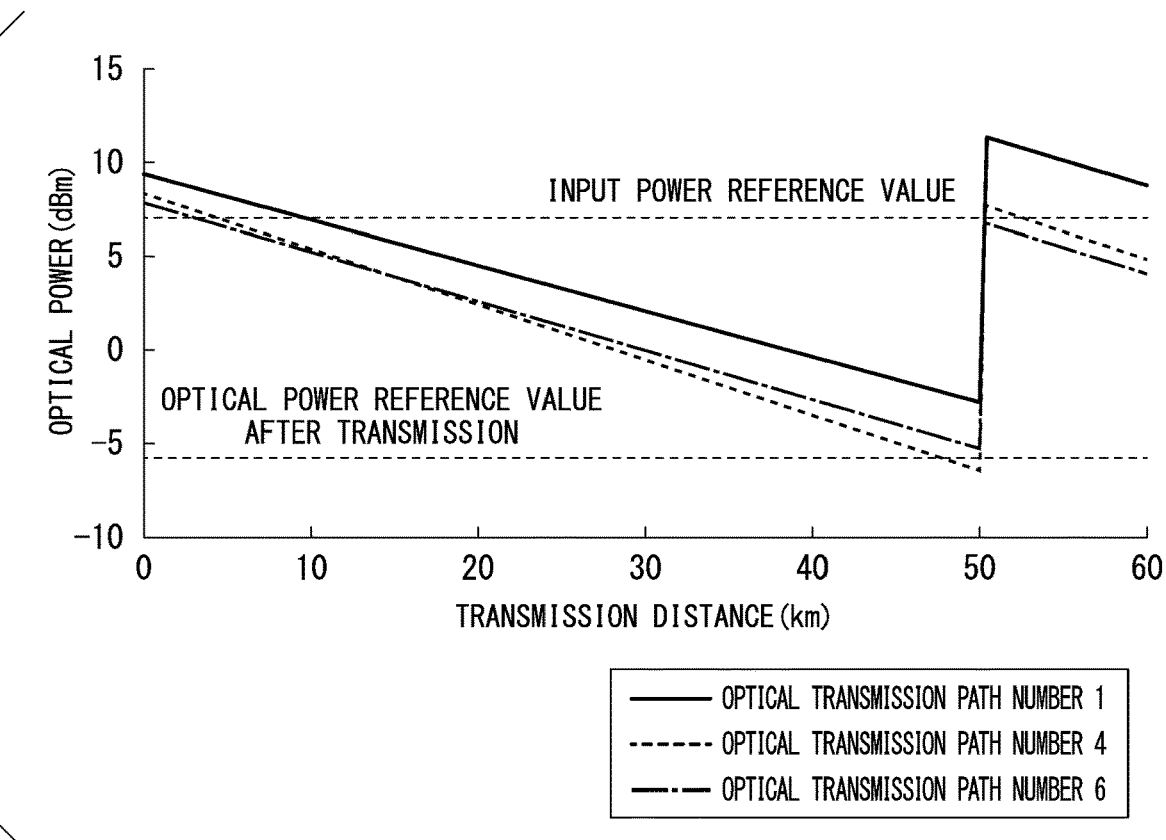
FIG. 4B is a diagram showing optical power levels of an optical signal before application of the first embodiment.

FIGS. 4A and 4B are diagrams showing optical power levels of an optical signal before application of the first embodiment. FIG. 4A is a diagram showing optical intensities after transmission of an optical signal through seven optical fibers 111-1 to 111-7 over 50 km and optical intensities after amplification using the multi-channel optical amplifier 121 as one example. Each of the optical fibers 111-1 to 111-7 is a standard single-mode optical fiber having a length of 50 km, a cladding diameter of 125 μm, and an effective cross-sectional area of 80 μm². In order to maintain the signal quantity of an optical signal even after transmission, it is necessary for an optical power level of the optical signal with respect to a noise level to be maintained equal to or higher than a predetermined level. A required optical signal-to-noise ratio OSNR differs depending on a modulation format. Generally, there is a trend that a higher OSNR is required as a signal has a higher degree of multiple values and a higher speed.

FIG. 4A further shows a minimum power level that is required for transmission/reception of a WDM optical signal used in the first embodiment as an optical power reference value after transmission. In a case in which an optical signal after transmission is below the reference value, it is represented that predetermined signal quality cannot be maintained. In order for the optical signal to be above the optical power reference value also after transmission, an input power level may be set by counting backward from an average propagation loss of an optical fiber, and the level is represented as an input power reference value. On the other hand, when an input power level for an optical fiber is too high, the signal quality deteriorates in accordance with a nonlinear phenomenon. For this reason, it is necessary to set an input power level for an optical fiber to a value that is above the input power reference value as a lower limit and is not excessively high. As a result of measurement of transmission characteristics, in the example to which the first embodiment is applied, an optical power reference value after transmission is set to −6 dBm, and an input power reference value is set to 7 dBm.

In a case in which a WDM signal having the optical power levels shown in FIG. 3A is input to the optical transmission paths 101-1 to 101-7 (the optical transmission path numbers 1 to 7), the optical intensities after transmission through the optical fibers 111-1 to 111-7 are as shown in "optical intensities after transmission" in FIG. 4A. In accordance with deviations of input power, propagation losses and welding losses of the optical fibers 111-1 to 111-7, a difference in the optical power level occurs for each optical transmission path. As shown in FIG. 4A, the optical power level of the optical signal of the optical transmission path 101-4 (an optical transmission path number 4) is below the optical power reference value after transmission. The optical power level after pumping using the multi-channel optical amplifier 121 becomes 7.4 dBm, which is above the input power reference value, and is above an optical power reference value required for transmission. However, since the optical power level of the optical signal is below the optical power reference value after transmission once, the signal quality thereof deteriorates more than optical signals passing through the other optical transmission paths.

In addition, for the optical transmission path 101-6 (the optical transmission path number 6), the optical power level after transmission is not below the optical power reference value after transmission, but the optical power level after pumping has not reached an input power reference value. Although deterioration of the signal quality is not seen in this transmission section, the input optical power level for the next transmission section is lower than input optical power levels of the other optical transmission paths 101-1 to 101-5 and 101-7 (the optical transmission path numbers 1 to 5 and 7). For this reason, in the next transmission section, after transmission, the optical power level becomes lower than an optical power reference value after transmission, and there is a high possibility of the signal quality deteriorating.

FIG. 4B is a diagram showing an appearance of changes in the optical power level with respect to these transmission distances as a level diagram. FIG. 4B shows distance dependency of optical power levels of an optical transmission path 101-1 (an optical transmission path number 1) having standard transmission characteristics, an optical transmission path 101-4 (an optical transmission path number 4) of which an optical power level is below the optical power reference value after transmission, and an optical transmission path 101-6 (an optical transmission path number 6) of which an optical power level has not reached an input power reference value after pumping as a representative example.

In the optical transmission path 101-1, the optical power level at the time of input to an optical fiber 111-1 is 9.5 dBm. During the propagation through the optical fiber 111-1, an optical signal attenuates by 0.25 dB per km and becomes −3 dBm after 50 km of transmission. Then, a gain of 14 dB is added in accordance with pumping in a channel 1 of the multi-channel optical amplifier 121, and the optical power level becomes 11 dBm. An optical power level of an optical signal that has propagated through the optical fiber 111-1 is above both the optical power reference value after transmission and the input power reference value after pumping.

By contrast, in the optical transmission path 101-4, the optical power level at the time of input to the optical fiber 111-4 is 8.4 dBm. During the propagation through the optical fiber 111-4, an optical signal attenuates by 0.3 dB per km and becomes −6.6 dBm after 50 km of transmission, which is below a reference value. In addition, in the optical transmission path 101-6, the optical power level at the time of input to the optical fiber 111-6 is 8 dBm. During the propagation through the optical fiber 111-6, the optical signal attenuates by 0.27 dB per km and becomes −5.5 dBm after 50 km of transmission. Since a gain of a channel 6 of the multi-channel optical amplifier 121 is 12 dB, which is weak, the optical power level after pumping becomes 6.5 dBm, which is below the optical power reference value after transmission.

We may consider increasing the amount of amplification of the optical transmission path 101-6 by applying the hybrid optical amplification system described in the third example of the conventional technology and adding an individual optical amplifier of core pumping before and after a simultaneous optical amplifier of cladding pumping such that the optical power levels become higher than the input power reference value. However, a loss occurring in the optical fiber 111-4 of the optical transmission path 101-4 cannot be compensated for, and the OSNR deteriorates. As shown in FIG. 4B, even when the optical power is amplified using an optical amplifier later and is above the input power reference value, in a case in which the optical power level is below a reference value once, the influence of noise is added, and compensation cannot be performed.

Thus, the large-capacity optically amplified repeater system 11 according to the first embodiment has a configuration in which Raman amplification pumping light from the Raman amplification pumping light sources 151-1 to 151-7 is input to the optical transmission paths 101-1 to 101-7 through the wavelength multiplexers 131-1 to 131-7, and the intensity of light of the wavelength band of the optical signal is Raman amplified. The large-capacity optically amplified repeater system 11 has a configuration in which a Raman amplification amount is set in accordance with characteristic differences among the optical transmission paths 101-1 to 101-7. For example, each of the Raman amplification pumping light sources 151-1 to 151-7 outputs Raman amplification pumping light having a light intensity set in accordance with characteristic differences among the optical transmission paths 101-1 to 101-7, whereby a Raman amplification amount for an optical signal of the optical transmission path is set. Characteristic differences among the optical transmission paths are determined in accordance with differences in losses among the optical transmission media and the optical components used in the optical transmission paths 101-1 to 101-7 or intensities of light transmitted through the optical transmission paths 101-1 to 101-7. In addition, the characteristic differences among the optical transmission paths may be determined on the basis of differences among the gains of channels of the multi-channel optical amplifier 121 in addition to the differences in the losses. Furthermore, characteristic differences of light transmitted through the optical transmission paths 101-1 to 101-7 (differences in the optical intensities) may be used instead of the characteristic differences among the optical transmission paths.

As the wavelength multiplexers 131-1 to 131-7, those having a specification for multiplexing a pumping light source of a 1.4 μm band into an optical signal band of 1.5 to 1.6 μm are used. By using the wavelength multiplexer 131-4, Raman amplification pumping light having excitation wavelengths of 1425 nm and 1450 nm from the Raman amplification pumping light source 151-4 is input, and back Raman scattering is caused to occur in the optical fiber 111-4. In addition, by using the wavelength multiplexer 131-6, Raman amplification pumping light having excitation wavelengths of 1435 nm and 1450 nm from the Raman amplification pumping light source 151-6 is input, and back Raman scattering is caused to occur in the optical fiber 111-6. In this way, the Raman amplification pumping light sources 151-4 and 151-6 outputting Raman amplification pumping light having wavelengths other than the wavelength band of an optical signal propagating through the optical transmission paths 101-1 and 101-6 are used.

Figure 5A:
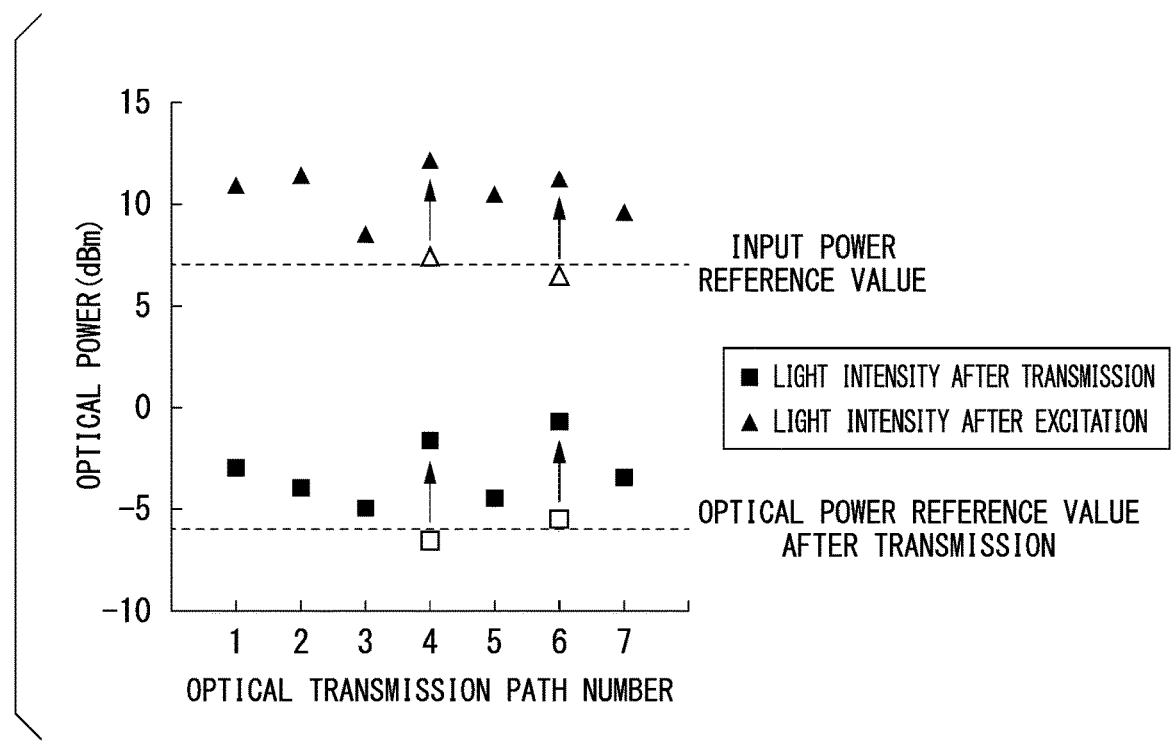
FIG. 5A is a diagram showing optical power levels of an optical signal after application of the first embodiment.
Figure 5B:
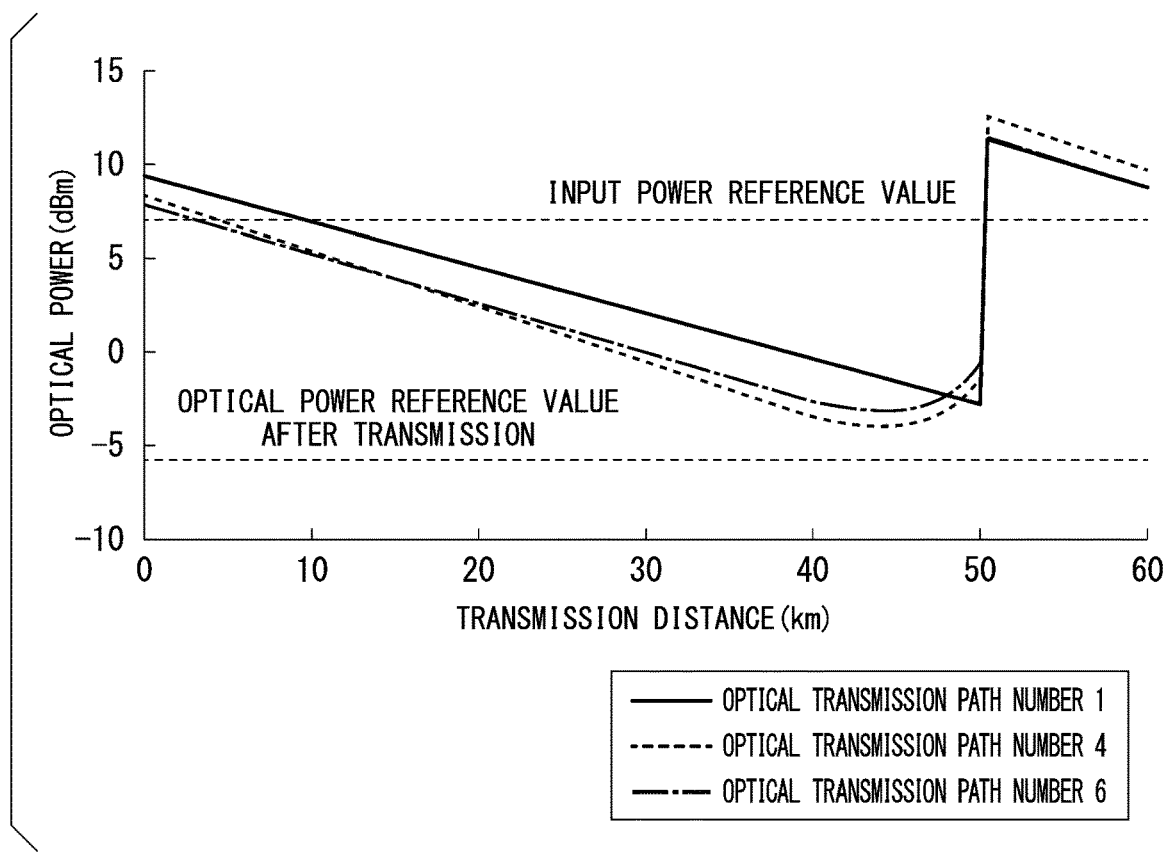
FIG. 5B is a diagram showing optical power levels of an optical signal after application of the first embodiment.

FIGS. 5A and 5B are diagrams showing optical power levels of an optical signal after application of the first embodiment. FIG. 5A is a diagram showing optical power levels after application of Raman excitation using the wavelength multiplexers 131-4 and 131-6 and the Raman amplification pumping light sources 151-4 and 151-6 in an optical transmission path 101-4 (an optical transmission path number 4) and an optical transmission path 101-6 (an optical transmission path number 6). FIG. 5B is a diagram showing changes in the optical power level with respect to a transmission distance. As shown in FIG. 4B, an optical signal of the optical transmission path 101-4 is below an optical power reference value after transmission. By contrast, in a case in which the configuration of the first embodiment is applied, as shown in FIG. 5B, the optical power level of the optical signal rises toward an output end of the optical fiber 111-4 in accordance with a Raman scattering effect, and the optical signal is transmitted 50 km without the optical power level of the optical signal going below the reference value. In addition, for the optical transmission path 101-6, although the gain of the channel 6 of the multi-channel optical amplifier is low, the optical power level of the optical signal rises toward an output of the optical fiber 111-6 in accordance with the Raman scattering effect, and the optical power level after 50 km of transmission is above a standard level. As a result, the optical power level (the light intensity) of the optical signal after amplification using the multi-channel optical amplifier 121 is above the input power reference values.

An optical transmission system applied the configuration of the first embodiment can reduce characteristic deviations among optical transmission paths. By contrast, the deviations cannot be reduced by an optically amplified repeater system using only a conventional optical fiber amplifier. By applying the configuration of the first embodiment, a large-capacity optically amplified repeater system having excellent transmission quality is realized.

The number of optical transmission paths, the transmission path length, the type of optical fiber, the setting of optical power levels, the modulation format of an optical signal, the wavelength arrangement, the optical power levels, and the like described above are examples and any combination of them may be applied. In addition, although the simultaneous pumping optical fiber amplifier of cladding pumping is used as the multi-channel optical amplifier 121, the effects of the present invention can be similarly acquired even in a case in which any simultaneous pumping optical amplifier that can excite a plurality of optical amplification media using one pumping light source is used. In addition, in the first embodiment, an example in which Raman amplification is applied to two optical transmission paths particularly having high losses and transmission characteristics not reaching a reference level among N (seven) optical transmission paths has been described. However, an optical transmission system having better transmission characteristics is also realized by applying Raman amplification to an optical transmission path having transmission characteristics that have reached the reference level and have worse transmission characteristic than the other cores. For the purpose of alleviating an average characteristic deviation, it is not necessary to apply Raman amplification to all the N optical transmission paths, and the effects can also be acquired by applying Raman amplification to one optical transmission path to about a half of the optical transmission paths. However, in consideration of the features of the first embodiment, in an optical transmission system formed from N optical transmission paths, by applying Raman amplification to a maximum of (N−1) of those optical transmission paths, the effects to be acquired by the large-capacity optically amplified repeater system of the first embodiment can be maximally acquired. In such a case, Raman amplification is applied to optical transmission paths other than an optical transmission path having the best transmission characteristics. In addition, an optical transmission path to which Raman amplification is applied may be determined on the basis of gains of the channels of the multi-channel optical amplifier 121. For example, Raman amplification may be applied to an optical transmission path corresponding to a channel of which the gain according to the multi-channel optical amplifier 121 is lower than those of the other channels.

In addition, depending on an optical signal that has been transmitted, there is a possibility that an optical transmission path requiring Raman amplification may be changed, and accordingly, a configuration in which N wavelength multiplexers and Raman amplification pumping light sources of N series are included for N optical transmission paths is shown in FIG. 1. Raman amplification pumping light sources of a maximum of (N−1) series may be driven at the same time. For example, by switching an optical transmission path for which Raman amplification is performed manually or using a changeover switch, similar effects can be acquired for a small number of Raman amplification pumping light sources. Alternatively, we may consider branching the Raman amplification pumping light output from a Raman amplification pumping light source and inputting the branched Raman amplification pumping light to a plurality of optical transmission paths at the same time. In this way, according to the first embodiment, although a distributed Raman scattering effect is applied to some optical transmission paths having high transmission losses, and loss compensation is performed, a distributed Raman scattering effect can be applied to some arbitrary optical transmission paths among the plurality of optical transmission paths.

Second Embodiment

A second embodiment shows an optically amplified repeater system in which a plurality of optical transmission paths include a multicore optical fiber having a plurality of cores in one optical fiber. Hereinafter, the second embodiment will be described focusing on differences from the first embodiment.

Figure 6:
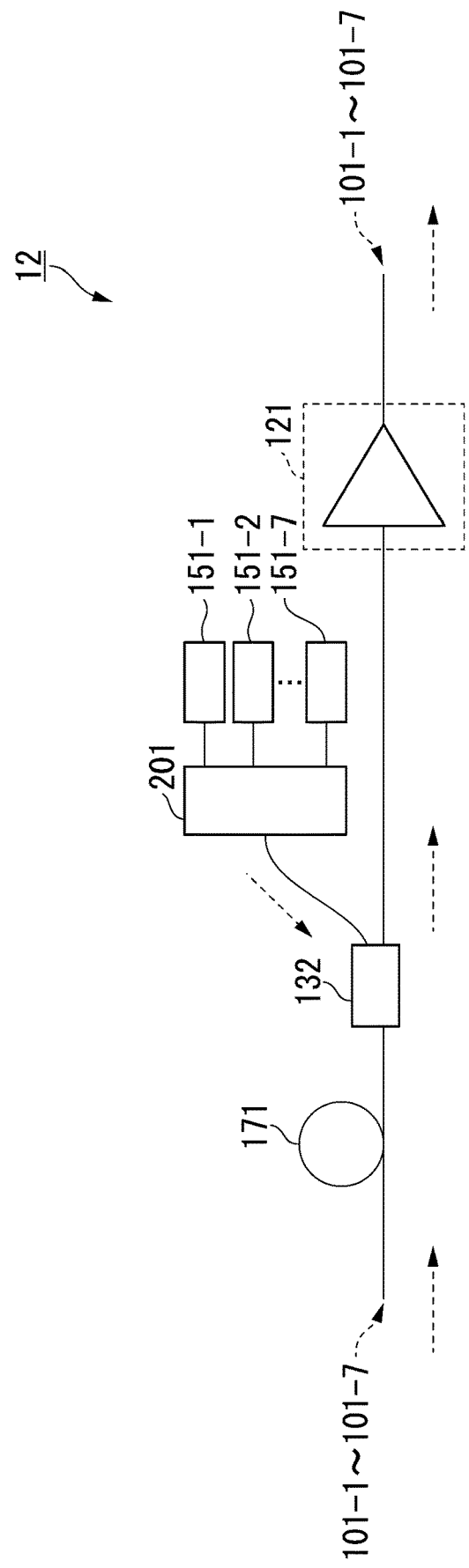
FIG. 6 is a schematic configuration diagram of a large-capacity optically amplified repeater system according to a second embodiment.

FIG. 6 is a schematic configuration diagram of a large-capacity optically amplified repeater system 12 according to the second embodiment of the present invention. The large-capacity optically amplified repeater system 12 includes optical transmission paths 101-1 to 101-N, a multi-channel optical amplifier 121, a wavelength multiplexer 132, Raman amplification pumping light sources 151-1 to 151-N, and an input/output device 201. FIG. 6 shows a case of N=7 as an example. A main difference between the large-capacity optically amplified repeater system 12 shown in FIG. 6 and the large-capacity optically amplified repeater system 11 of the first embodiment is that the plurality of optical transmission paths 101-1 to 101-N include a multicore optical fiber 171. In addition, the wavelength multiplexer 132 inputting Raman amplification pumping light corresponds to a core arrangement of a multicore optical fiber 171 having a plurality of cores. The large-capacity optically amplified repeater system 12 allows Raman amplification pumping light from the Raman amplification pumping light sources 151-1 to 151-N corresponding to a plurality of cores to be input using one wavelength multiplexer 132, which is different from the large-capacity optically amplified repeater system 11 of the first embodiment.

In this way, a plurality of optical fibers on the optical transmission paths 101-1 to 101-N and the wavelength multiplexer are integrated, and the multicore optical fiber 171, the wavelength multiplexer 132, and N optical paths of the multi-channel optical amplifier 121 are mutually connected and optically coupled by using the multicore optical fiber 171 and the wavelength multiplexer 132 that is a multi-channel wavelength multiplexer. In this way, while increases in the cost and the area of the installation places of facilities are inhibited, an optically amplified repeater system having a large capacity can be realized. Mutual connection of the multicore optical fiber 171, the wavelength multiplexer 132, and the multi-channel optical amplifier 121, for example, is performed by connecting each core of the multicore optical fiber 171 and an input port of the wavelength multiplexer 132 and connecting a transmission port of the wavelength multiplexer 132 and an input port of the multi-channel optical amplifier 121. For such connection, any one of welding connection, a light connector, and a spatial optical system may be used.

Figure 7:
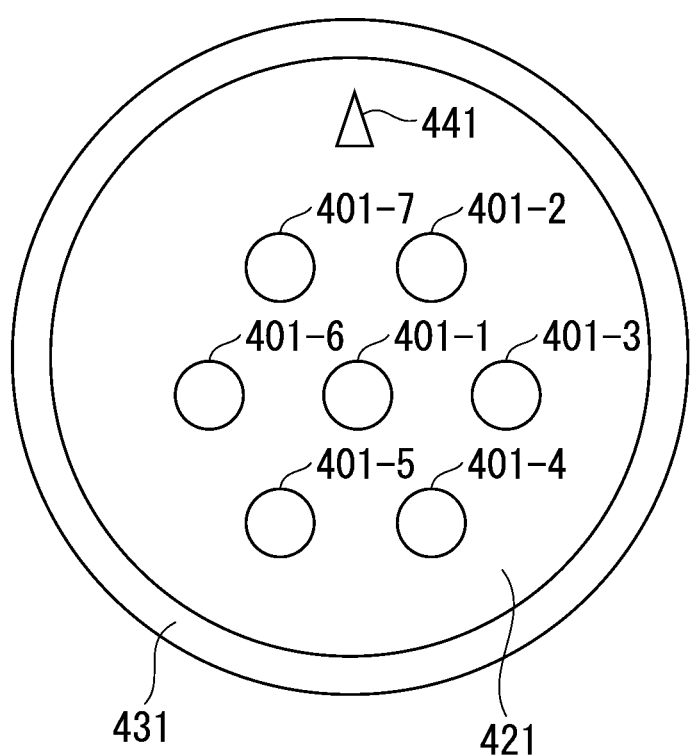
FIG. 7 is a diagram showing a cross-sectional view of a multicore optical fiber according to the second embodiment.

FIG. 7 is a diagram showing a cross-sectional view of the multicore optical fiber 171 according to the second embodiment. On a cladding 421 covered with a coating 431, N=7 cores 401-1 to 401-N are disposed. In addition, the multicore optical fiber 171 includes a marker 441 for positioning at the time of connecting multicore optical fibers. A coating diameter is set to 320 μm, a cladding diameter is set to 200 an effective cross-sectional area of the core is set to 80 μm$^2$, and a core gap is set to 50 In the second embodiment, an input signal is set as a 40 WDM polarization-multiplexed 16 QAM signal obtained by performing wavelength division multiplexing (WDM) of 40 wavelength channels at 100 GHz spacing, performing polarization multiplexing and modulating the signal using a 16 QAM format.

As shown in FIG. 6, by using a spatial optical-type wavelength multiplexer of N=7 channels as the wavelength multiplexer 132, one multiplexer can multiplex pumping light of the band of 1.4 μm corresponding to seven cores into an optical signal band of 1.5 μm. An optical signal transmitted through the multicore optical fiber 171 is input to the input port of the wavelength multiplexer 132, is output from the transmission port of the band of 1.5 μm of the wavelength multiplexer 132, and then is transmitted to the multi-channel optical amplifier 121. Raman amplification pumping light from the Raman amplification pumping light sources 151-1 to 151-N is input to a multiplexing port of the band of 1.4 μm of the wavelength multiplexer 132 in a direction opposite to the propagation direction of the optical signal. In this way, the Raman amplification pumping light is input to each of the cores 401-1 to 401-N of the multicore optical fiber 171, and Raman scattering occurs. Here, each of three ports of the wavelength multiplexer 132 is configured to use a multicore optical fiber having seven cores of which specifications are similar to those of the multicore optical fiber 171. When the Raman amplification pumping light from the Raman amplification pumping light sources 151-1 to 151-N is input to the port of the multicore optical fiber 171 of the wavelength multiplexer 132, the input/output device 201 that is a fan-in/fan-out input/output device is used such that the Raman amplification pumping light of the Raman amplification pumping light source 151-n (here, n is an integer equal to or larger than "1" and equal to or lower than N) is input to the core 401-*n* of the multicore optical fiber.

The second embodiment shown above shows an application example of the present invention in an optically amplified repeater system formed from a plurality of optical transmission paths including a multicore optical fiber. By using a multicore optical fiber and a multi-channel wavelength multiplexer/demultiplexer, the optical transmission path and the pumping light are spatially multiplexed and are used by the system. Accordingly, an optically amplified repeater system that is more appropriate for implementation of a large capacity and inhibits a characteristic deviation among a plurality of optical transmission paths is realized.

Third Embodiment

In a third embodiment, one example of an optically amplified repeater system according to an embodiment that includes an optical device combining a plurality of optical elements having different functions is shown. Hereinafter, the third embodiment will be described with differences from the second embodiment focused on.

Figure 8:
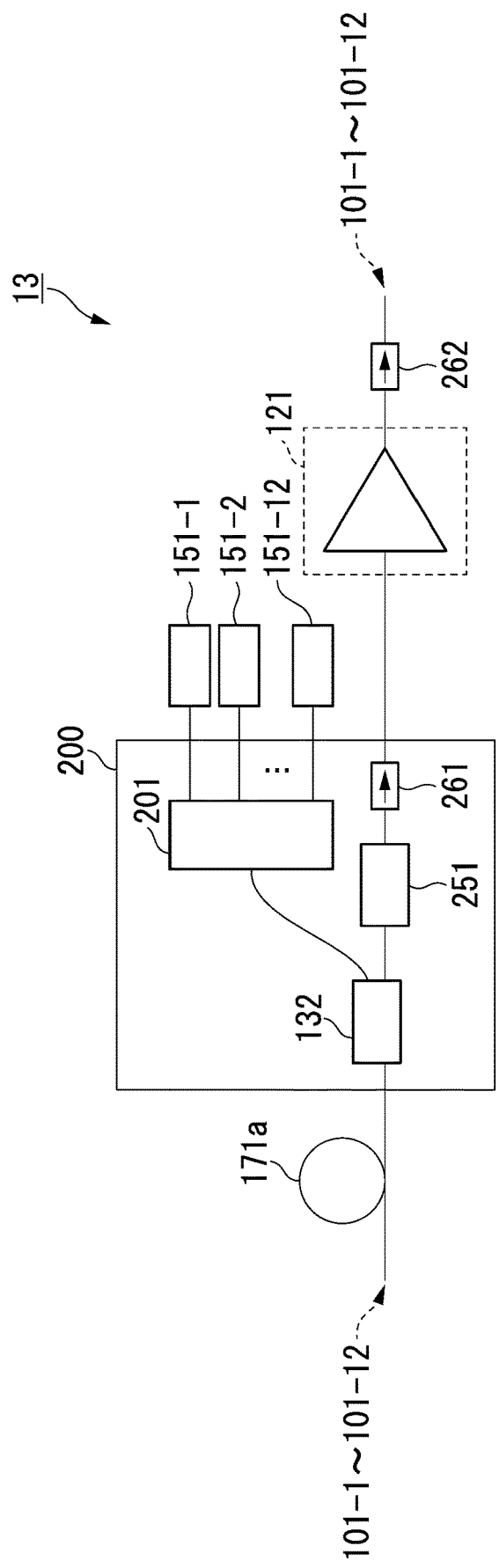
FIG. 8 is a schematic configuration diagram of a large-capacity optically amplified repeater system according to a third embodiment.

FIG. 8 is a schematic configuration diagram of a large-capacity optically amplified repeater system 13 according to the third embodiment of the present invention. FIG. 8 shows an example of a case of N=12. A main difference between the large-capacity optically amplified repeater system 13 shown in FIG. 8 and the large-capacity optically amplified repeater system 12 of the second embodiment shown in FIG. 6 is in that the large-capacity optically amplified repeater system 13 further includes a variable optical attenuator 251 that can attenuate light intensities of N channels together and an optical isolator 261 that can secure isolation of light of N channels together. By using the variable optical attenuator 251, input power levels of light input to each port of the multi-channel optical amplifier 121 can be adjusted simultaneously.

Figure 9:
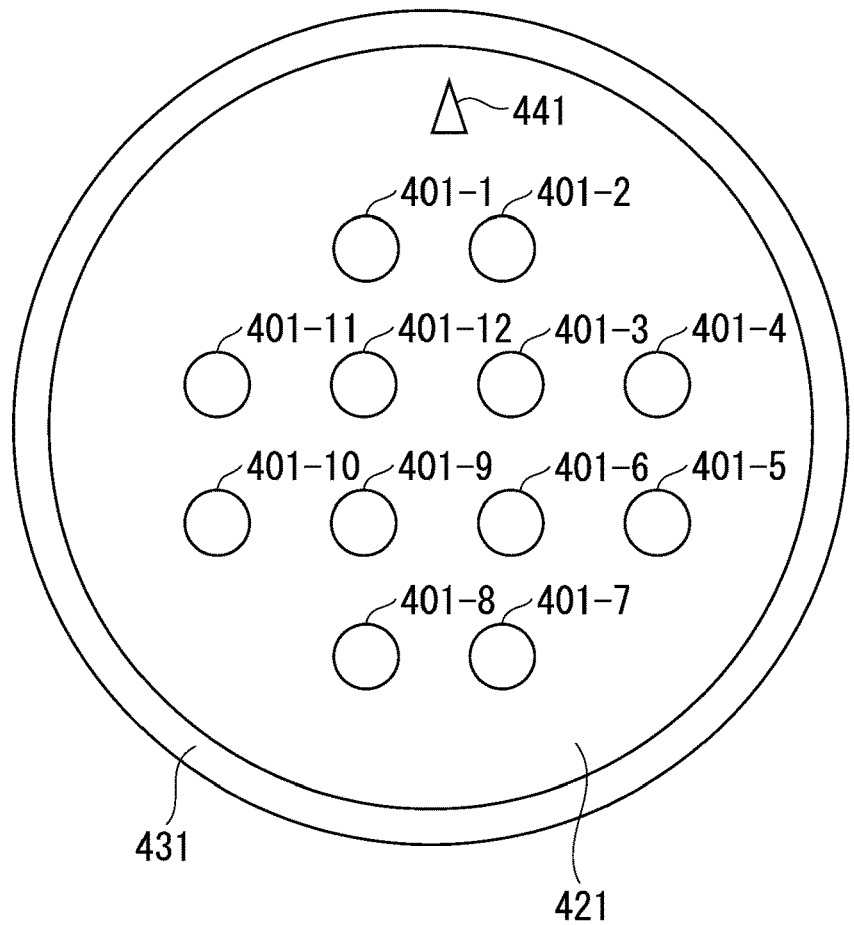
FIG. 9 is a diagram showing a cross-sectional view of a multicore optical fiber according to the third embodiment.

FIG. 9 is a diagram showing a cross-sectional view of the multicore optical fiber 171*a* according to the third embodiment. In the third embodiment, as shown in FIG. 9, a multicore optical fiber 171*a* of N=12 cores in which the cores 401-1 to 401-N are disposed on a cladding 421 covered with a coating 431 is used. In addition, the multicore optical fiber 171*a* includes a marker 441 for positioning at the time of connecting multicore optical fibers. A cladding diameter is set to 230 μm, an effective cross-sectional area of the core is set to 110 μm$^2$, and a core gap is set to 40 μm. In the third embodiment, an input signal is set as a 200-wave WDM polarization-multiplexed 32 QAM signal obtained by performing wavelength division multiplexing (WDM) of 200 wavelengths at the intervals of 50 GHz, performing polarization multiplexing of each wavelength, and modulating using a 32 QAM format.

In addition, as shown in FIG. 8, the large-capacity optically amplified repeater system 13 according to the third embodiment includes an optical device 200 housing the wavelength multiplexer 132, an input/output device 201, the variable optical attenuator 251, and the optical isolator 261 in one casing. The configuration is different from the large-capacity optically amplified repeater system 12 of the second embodiment. In this way, one optical device can include functions of resolving a characteristic deviation between optical transmission paths according to Raman amplification pumping light inputs to optical transmission paths corresponding to N cores, adjustment of optical power levels, and isolation, and accordingly, an optically amplified repeater system corresponding to a large capacity can be realized while the cost and the installation places of facilities are inhibited.

The optical device 200 according to the third embodiment is one example, and functional elements having any functions may be combined. As in the large-capacity optically amplified repeater system 12 according to the second embodiment, by combining a plurality of optical devices that not only extend spatially but also have different functions, an optically amplified repeater system having higher performance can be realized.

Figure 10:
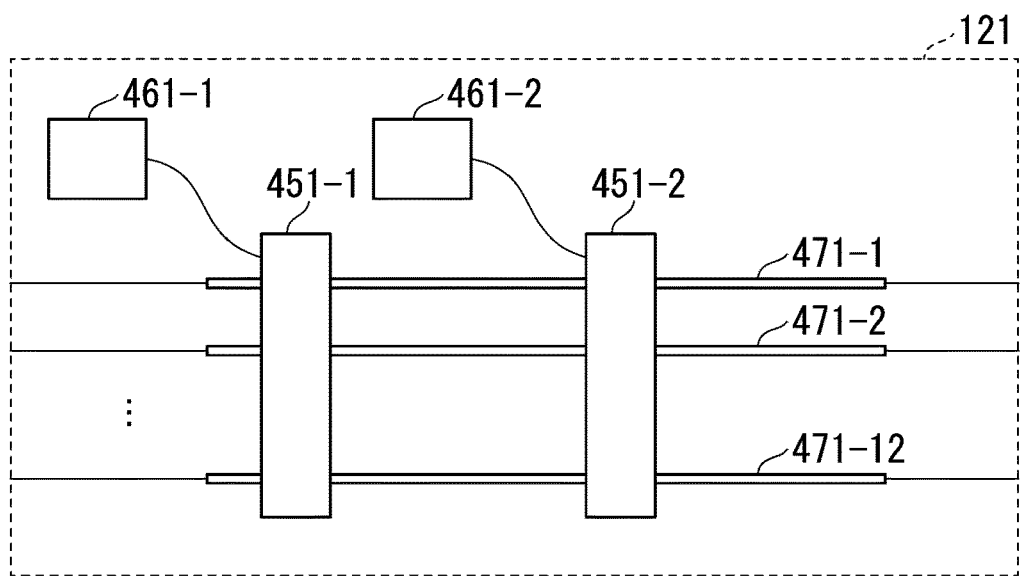
FIG. 10 is a schematic configuration diagram of a multi-channel optical amplifier according to the third embodiment.

FIG. 10 is a schematic configuration diagram of the multi-channel optical amplifier 121 according to the third embodiment. The multi-channel optical amplifier 121 includes K optical couplers 451-1 to 451-K, K (here, K is an integer that is equal to or larger than "1") simultaneous pumping light sources 461-1 to 461-K, and optical amplification media 471-1 to 471-N. Light in an optical transmission path 101-*n* passes through optical amplification medium 471-*n* (here, n is an integer that is equal to or larger than "1 and is equal to or smaller than N). The optical coupler 451-*k* (here, k is an integer that is equal to or larger than "1" and is equal to or smaller than K) optically couples pumping light of the simultaneous pumping light source 461-*k* on optical paths of the optical amplification media 471-1 to 471-N. As one example, the third embodiment has a configuration in which K=2 multi-mode pump laser diodes are used as the simultaneous pumping light sources 461-1 and 461-2 (see Non-Patent Document 7), and the optical couplers 451-1 and 451-2 excite N=12 optical amplification media 471-1 to 471-12 using a side pump system.

Fourth Embodiment

The second embodiment has a configuration in which a plurality of pieces of Raman amplification pumping light that are spatially multiplexed are input to a multicore optical fiber, and Raman amplification is performed. The fourth embodiment has a configuration in which light transmitted through each core of a multicore optical fiber is temporarily spatially split, and Raman amplification light is individually input via each optical transmission path. While the fourth embodiment will be described with differences from the second embodiment focused on, the differences may be applied to the third embodiment.

Figure 11:
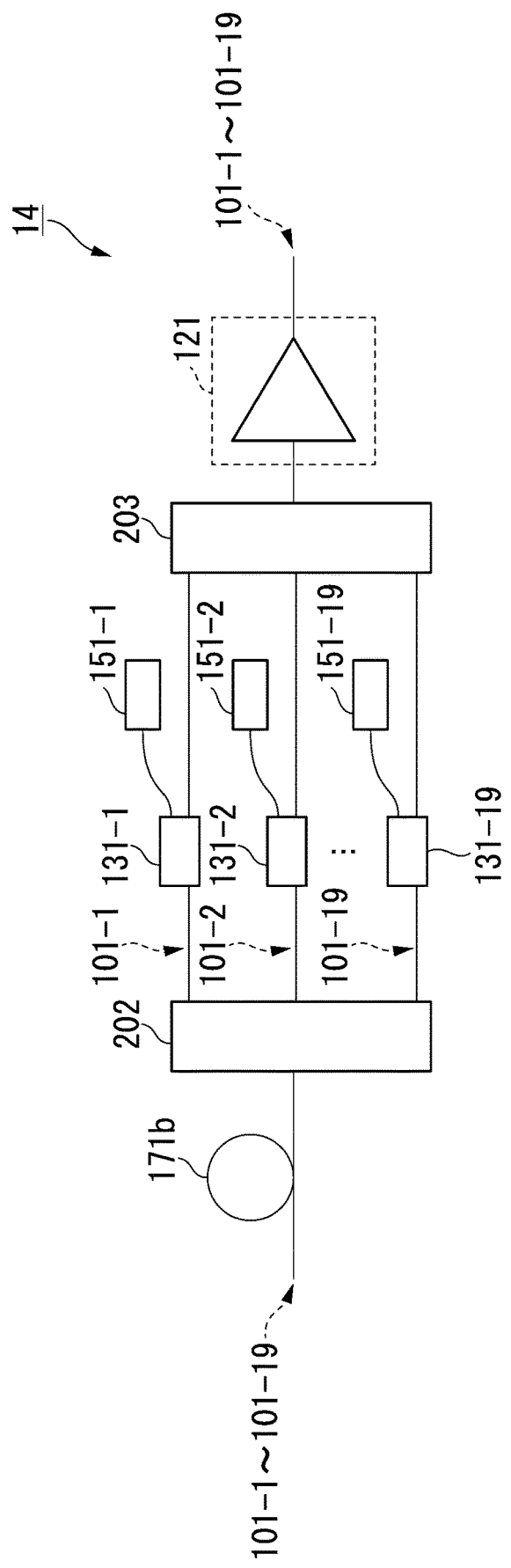
FIG. 11 is a schematic configuration diagram of a large-capacity optically amplified repeater system according to a fourth embodiment.

FIG. 11 is a schematic configuration diagram of a large-capacity optically amplified repeater system 14 according to the fourth embodiment of the present invention. Each of optical transmission paths 101-1 to 101-N includes one core of a multicore optical fiber 171*b* on the optical path. A main difference between the large-capacity optically amplified repeater system 14 and the large-capacity optically amplified repeater system 12 according to the second embodiment is in that pumping light is spatially multiplexed. The large-capacity optically amplified repeater system 12 according to the second embodiment has a configuration in which Raman pumping is performed by performing wavelength multiplexing of pumping light of a plurality of channels after spatially multiplexing the pumping light and inputting the pumping light to a multicore optical fiber. By contrast, the large-capacity optically amplified repeater system 14 according to the fourth embodiment has a configuration in which Raman pumping is performed by performing wavelength multiplexing of each piece of pumping light and then spatially multiplexing the pumping light and inputting the pumping light to a multicore optical fiber. In the large-capacity optically amplified repeater system 14, after the optical transmission paths 101-1 to 101-N of the multicore optical fiber 171b are temporarily separated individually using an input/output device 202, Raman amplification pumping light from a Raman amplification pumping light source 151-n (here, n is an integer that is equal to or larger than "1" and is equal to or smaller than N) is multiplexed into the optical transmission path 101-n using the wavelength multiplexer 131-n. FIG. 11 shows a case of N=19 as an example.

Figure 12:
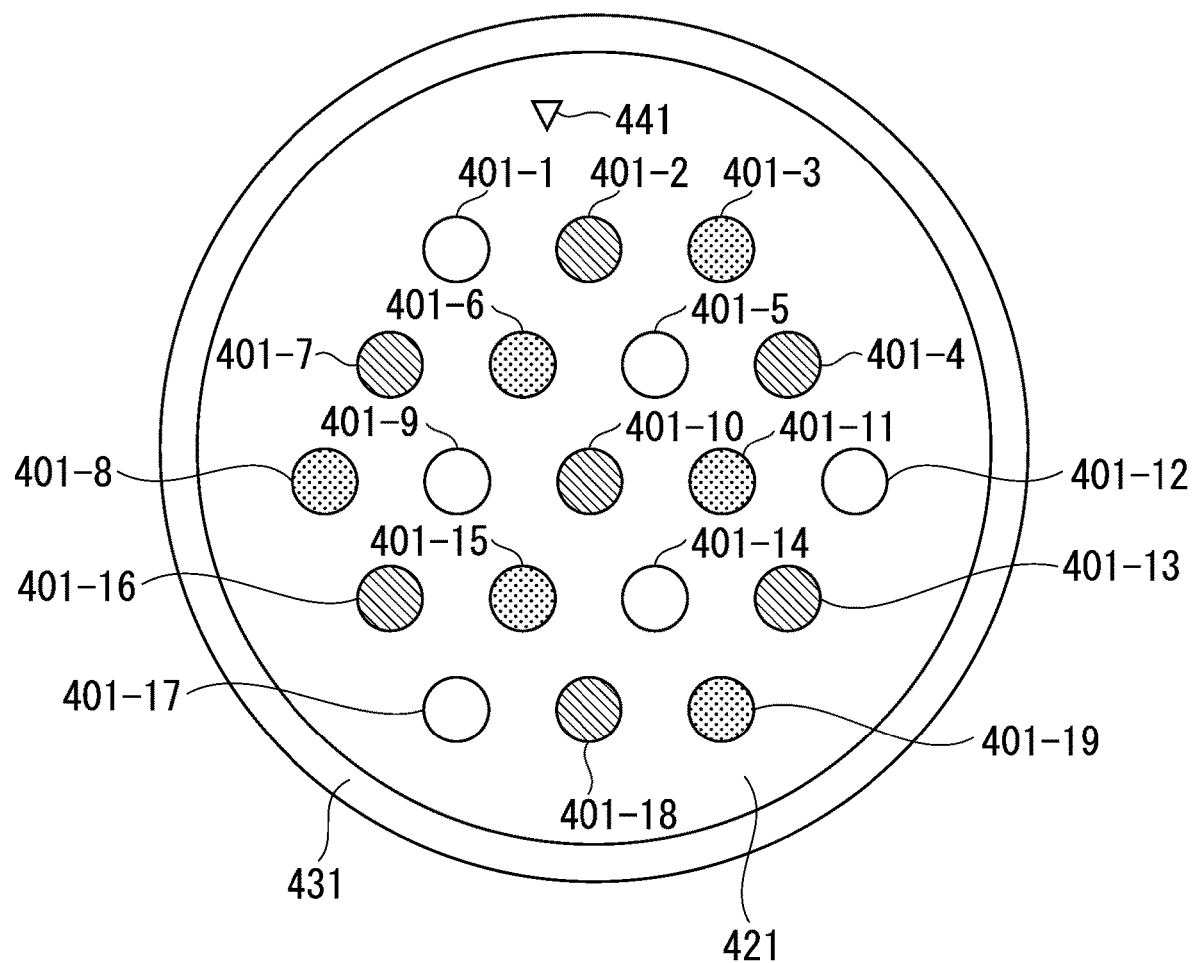
FIG. 12 is a diagram showing a cross-sectional view of a multicore optical fiber according to the fourth embodiment.

FIG. 12 is a diagram showing a cross-sectional view of the multicore optical fiber 171b according to the fourth embodiment. On a cladding 421 covered with a coating 431, N=19 cores 401-1 to 401-N are disposed. In addition, the multicore optical fiber 171b includes a marker 441 for positioning at the time of connecting multicore optical fibers. A cladding diameter is set to 250 µm, an effective cross-sectional area of the core is set to 100 µm$^2$, and a core gap is set to 35 µm. In the fourth embodiment, an input signal is set as a 80-wave WDM polarization-multiplexed QPSK signal that is WDM light acquired by performing wavelength division multiplexing (WDM) of 80 wavelengths at the intervals of 50 GHz, performing polarization multiplexing of each wavelength, and modulating resultant light using a QPSK format.

N cores 401-1 to 401-N are a multicore optical fiber having a heterogeneous structure formed by cores of a core type A, a core type B, and a core type C of three types having different refractive index distributions. Cores 401-1, 401-5, 401-9, 401-12, 401-14, and 401-17 are configured as the core type A, cores 401-2, 401-4, 401-7, 401-10, 401-13, 401-16, and 401-18 are configured as the core type B, and cores 401-3, 401-6, 401-8, 401-11, 401-15, 401-19 are configured as the core type C. In this way, in the case of a multicore optical fiber having multiple cores in one optical fiber, the cross-sectional area of the optical fiber is limited, and accordingly, it is necessary to arrange the cores densely. However, as a distance between cores becomes short, leakage of light from adjacent cores increases, and crosstalk increases. In the case of a non-coupling or weakly-coupling multicore optical fiber in which each core is handled as an independent optical transmission path, the signal quality deteriorates in accordance with crosstalk between cores. Thus, by using a property that cores having mutually-different refractive index distributions make the influence of leaked light inhibited, the optical fiber having the heterogeneous structure is used.

As shown in FIG. 11, the input/output device 203 multiplexes light of the optical transmission paths 101-1 to 101-N that is Raman-amplified using the Raman amplification pumping light and outputs the multiplexed light to the multi-channel optical amplifier 121. Similar to the second embodiment or the third embodiment, the multi-channel optical amplifier 121 amplifies light intensities of light transmitted through the optical transmission paths 101-1 to 101-N together.

As above, the fourth embodiment shows an application example of the present invention in an optically amplified repeater system formed from a plurality of optical transmission paths including a multicore optical fiber. By spatially multiplexing the optical transmission path using the multi-core optical fiber and using the optical transmission path in the system, an optically amplified repeater system that is more appropriate for implementation of a large capacity and inhibits a characteristic deviation between optical transmission paths is realized.

Fifth Embodiment

The first embodiment provides a system inhibiting characteristic deviations among a plurality of optical transmission paths by applying Raman amplification to light passing through a plurality of optical fibers. The second to fourth embodiments provide systems inhibiting characteristic deviations among a plurality of optical transmission paths by applying Raman amplification to light transmitted to each core of the multicore optical fiber. In contrast to this, a fifth embodiment shows an application example for an optical transmission path in which the multicore optical fiber described above and a plurality of optical fibers described above are installed in a vertical column. The fifth embodiment will be described with differences from the fourth embodiment described above focused on.

Figure 13:
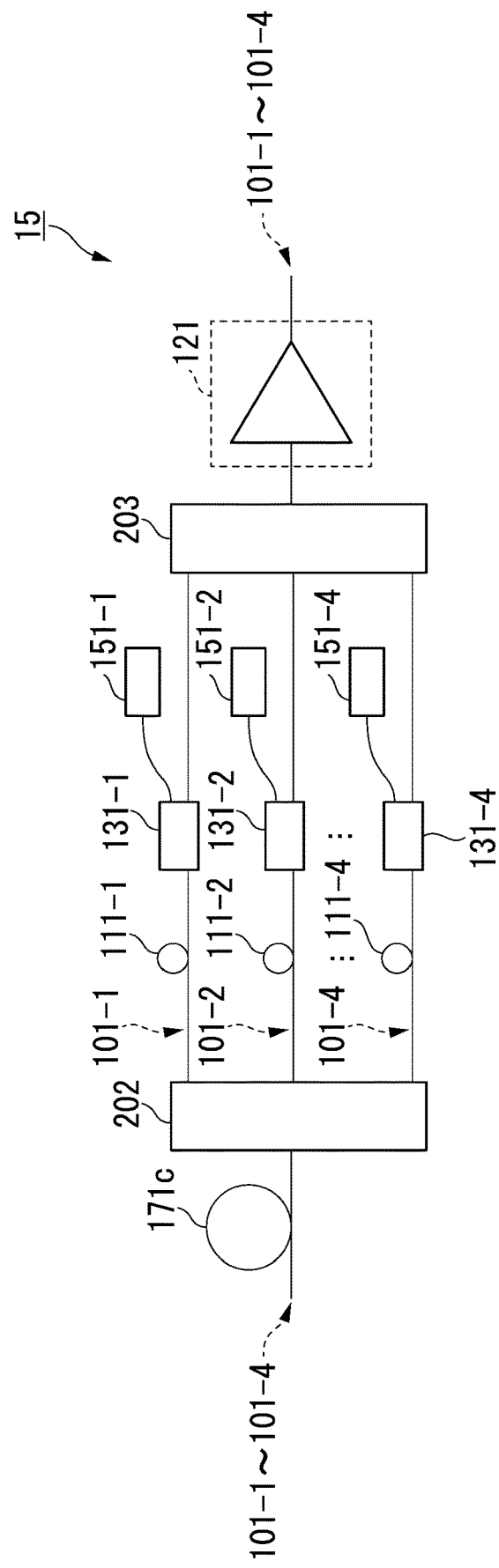
FIG. 13 is a schematic configuration diagram of a large-capacity optically amplified repeater system according to a fifth embodiment.

FIG. 13 is a schematic configuration diagram of a large-capacity optically amplified repeater system 15 according to the fifth embodiment of the present invention. A main difference between the large-capacity optically amplified repeater system 15 and the large-capacity optically amplified repeater system 14 according to the fourth embodiment is in that, after an input/output device 202 dividing optical transmission paths 101-1 to 101-N including cores of a multicore optical fiber 171c into individual optical transmission paths, a plurality of optical fibers 111-n are disposed in the divided optical transmission paths 101-n (here, n is an integer that is equal to or larger than "1" and is equal to or smaller than N). After an optical signal is transmitted through a plurality of cores of the multicore optical fiber 171c and a plurality of optical fibers 111-n, Raman amplification pumping light from a Raman amplification pumping light source 151-n is multiplexed into the optical signal by a wavelength multiplexer 131-n. In the fifth embodiment, induced Raman scattering is caused to occur inside the optical fiber 111-n. FIG. 13 shows a case of N=4 as an example.

Figure 14:
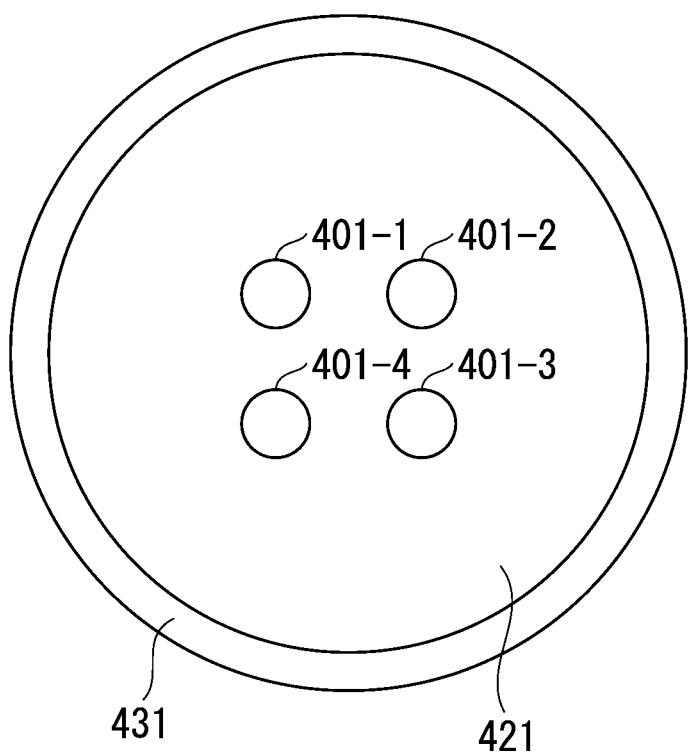
FIG. 14 is a diagram showing a cross-sectional view of a multicore optical fiber according to the fifth embodiment.

FIG. 14 is a diagram showing a cross-sectional view of the multicore optical fiber 171c according to the fifth embodiment. On a cladding 421 covered with a coating 431, N=4 cores 401-1 to 401-N are disposed. The multicore optical fiber 171c is a coupling core-type multicore optical fiber in which optical signals of a plurality of cores are transmitted while being coupled due to the cores approaching each other. A cladding diameter is set to 125 µm, an effective cross-sectional area of the core is set to 110 µm$^2$, and a core gap is set to 20 µm.

As shown in FIG. 13, the length of the multicore optical fiber 171c of four cores is 20 km, and the length of each of the four optical fibers 111-1 to 111-4 is 40 km. An optical signal acquired by modulating 100 waveforms at the intervals of 25 GHz using polarization-multiplexed QPSK is input to each of the four optical transmission paths 101-1 to 101-4 and is transmitted through the multicore optical fiber 171c and the optical fibers 111-1 to 111-4. After transmission through the optical fibers 111-1 to 111-4, four optical transmission paths are multiplexed using the input/output device 203, and optical intensities are amplified simultaneously using a four-channel optical amplifier as the multi-channel optical amplifier 121. By using the Raman amplification pumping light source 151, Raman amplification is applied to some optical transmission paths among the four optical transmission paths such that signal qualities of the four optical transmission paths after transmission are the best.

For example, by at least one of the Raman amplification pumping light sources 151-1 to 151-4 outputting Raman amplification pumping light having a light intensity according to a characteristic difference between optical transmission paths, the large-capacity optically amplified repeater system 15 may acquire a desired Raman amplification amount in some optical transmission paths. A characteristic difference between optical transmission paths may be determined on the basis of a difference in the transmission loss between cores of the multicore optical fiber 171c and a difference in the transmission loss among the optical fibers 111-1 to 111-4. In the multicore optical fiber 171c and the optical fibers 111-1 to 111-4, Raman amplification may be applied to an optical transmission path having the largest transmission loss or an optical transmission path having the lowest optical power level of a transmitted optical signal. In addition, light intensities of Raman amplification pumping light output from the Raman amplification pumping light sources 151-1 to 151-4 may be determined on the basis of a difference in the gain between channels of the multi-channel optical amplifier 121 or an OSNR required for a transmitted optical signal.

In addition, in the fifth embodiment, although induced Raman scattering is caused to occur in the optical fibers 111-1 to 111-4, Raman amplification may be performed for both the optical fibers and the multicore optical fiber. In addition, the order may be reversed, and thus, the optical signal may be caused to be propagated through a core of the multicore optical fiber after an optical signal is propagated through a plurality of optical fibers. As above, the fifth embodiment has shown an application example of the present invention in an optically amplified repeater system formed from a plurality of optical transmission paths including a multicore optical fiber and a plurality of optical fibers. By applying Raman amplification to some optical transmission paths, an optically amplified repeater system set such that transmission characteristics of the plurality of optical transmission paths are best is realized.

Sixth Embodiment

A sixth embodiment shows one example of an optically amplified repeater system in which an optical transmission path includes a plurality of multicore optical fibers. The sixth embodiment will be described with differences from the embodiments described above focused on.

Figure 15:
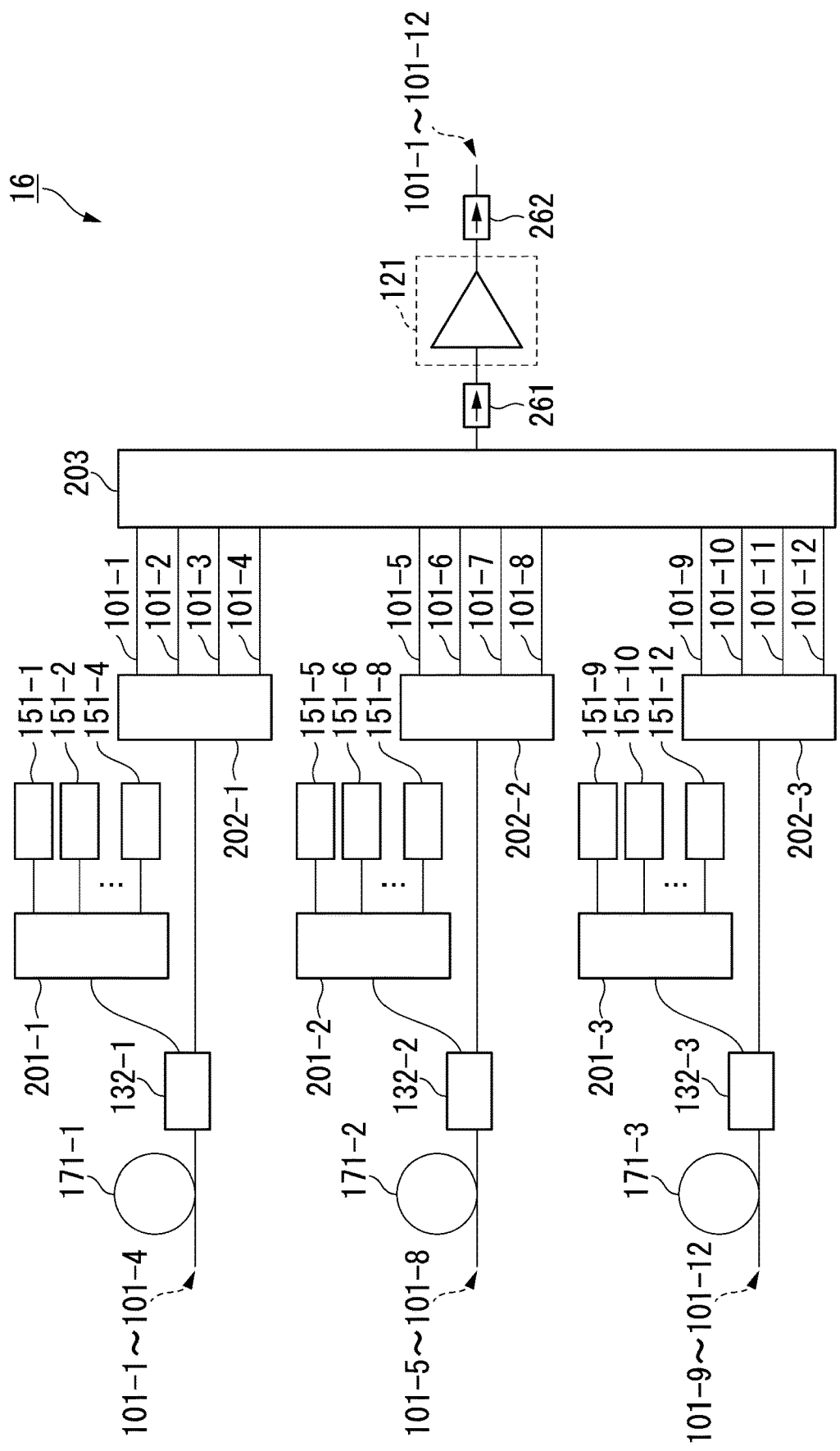
FIG. 15 is a schematic configuration diagram of a large-capacity optically amplified repeater system according to a sixth embodiment.

FIG. 15 is a schematic configuration diagram of a large-capacity optically amplified repeater system 16 according to the sixth embodiment of the present invention. Light of optical transmission paths 101-1 to 101-N (here, N is an integer equal to or larger than "2") is propagated through any one core of M (here, M is an integer equal to or larger than "2", M<N) multicore optical fibers 171-1 to 171-M. The sixth embodiment shows an example of N=12, and M=3. The large-capacity optically amplified repeater system 16 includes optical transmission paths 101-1 to 101-N, wavelength multiplexer 132-1 to 132-M, Raman amplification pumping light sources 151-1 to 151-N, input/output devices 201-1 to 201-M, 202-1 to 202-M, and 203, an optical isolator 261, a multi-channel optical amplifier 121, and an optical isolator 262.

As shown in FIG. 15, light of optical transmission paths 101-(4m-3) to 101-4m is inserted into each core of a multicore optical fiber 171-m (here, m is an integer that is equal to or larger than "1" and is equal to or smaller than M). Similar to the third embodiment, Raman amplification pumping light from Raman amplification pumping light sources 151-(4m-3) to 151-4m is input to the wavelength multiplexer 132-m through the input/output device 201-m. The wavelength multiplexer 132-m multiplexes Raman amplification pumping light from the Raman amplification pumping light sources 151-(4m-3) to 151-4m to each core of the multicore optical fiber 171-m. After the multiplexing of the Raman amplification pumping light, the input/output device 202-m splits light of the optical transmission paths 101-(4m-3) to 101-4m that has been transmitted through each core of the multicore optical fiber 171-m.

The input/output device 203 inserts the light of the optical transmission paths 101-1 to 101-N to each core of the multicore optical fiber. The subsequent process is similar to that of the third embodiment. In other words, the optical isolator 261 outputs light of the optical transmission paths 101-1 to 101-N transmitted through each core of the multicore optical fiber toward the multi-channel optical amplifier 121, and the multi-channel optical amplifier 121 amplifies light transmitted through the optical transmission paths 101-1 to 101-N simultaneously. The optical isolator 262 outputs light of the optical transmission paths 101-1 to 101-N amplified by the multi-channel optical amplifier 121 in the same direction as output of the optical isolator 261.

In this way, the sixth embodiment has a configuration in which optical signals propagated through a plurality of multicore optical fibers 171-1 to 171-M are efficiently amplified simultaneously by one multi-channel optical amplifier 121. Then, by using Raman amplification, characteristic deviations among a plurality of cores of the multicore optical fiber and among a plurality of multicore optical fibers are compensated. Accordingly, an optically amplified repeater system that is appropriate for implementation of a large capacity and uniformizes signal quality among a plurality of optical transmission paths is realized.

Seventh Embodiment

A seventh embodiment shows one example of an optically amplified repeater system including a plurality of multicore optical fibers and a plurality of multi-channel optical amplifiers. The seventh embodiment will be described with differences from the sixth embodiment focused on.

Figure 16:
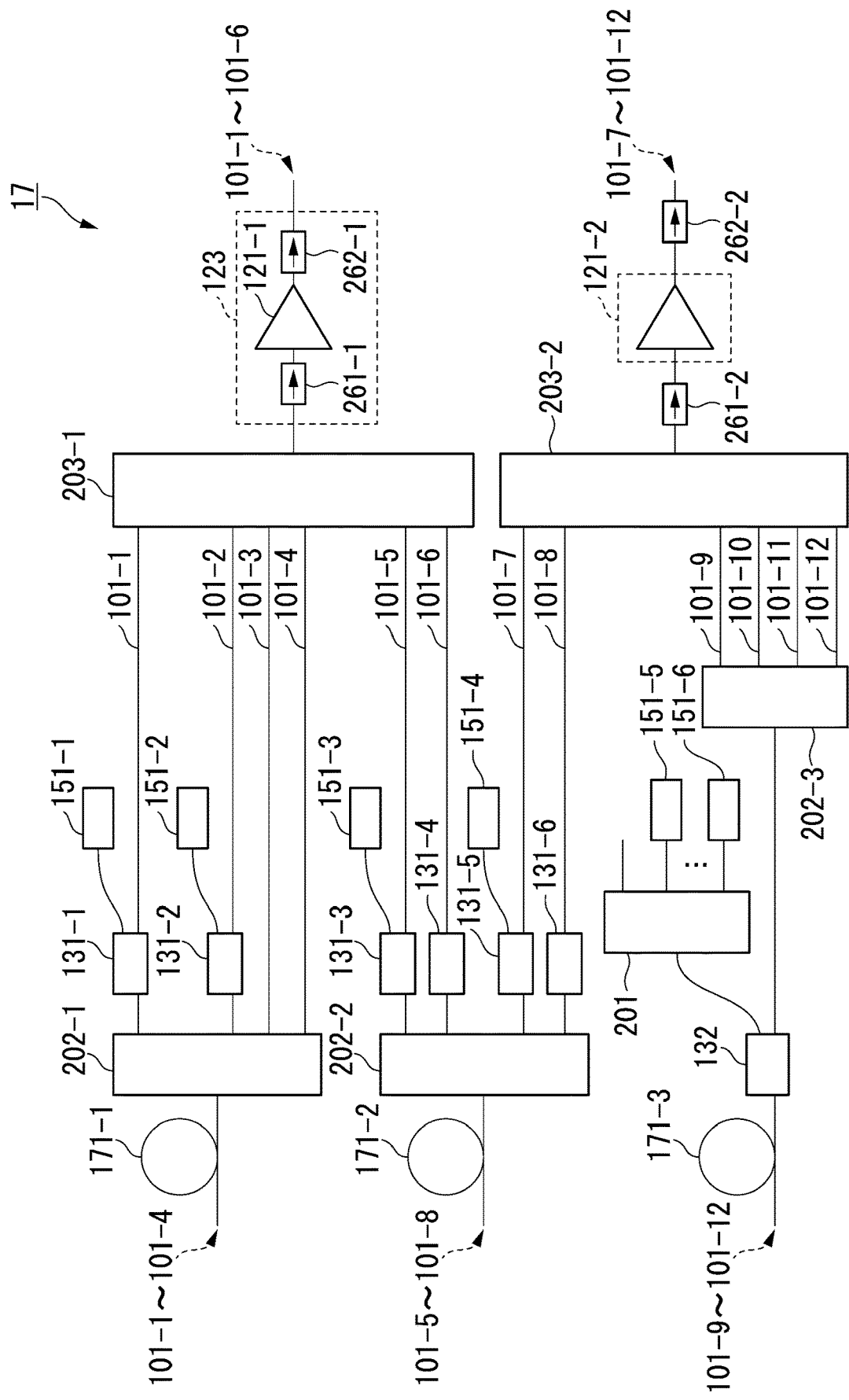
FIG. 16 is a schematic configuration diagram of a large-capacity optically amplified repeater system according to a seventh embodiment.

FIG. 16 is a schematic configuration diagram of a large-capacity optically amplified repeater system 17 according to the seventh embodiment. The large-capacity optically amplified repeater system 17 includes multicore optical fibers 171-1 to 171-3, input/output devices 202-1 to 202-3, wavelength multiplexers 131-1 to 131-6 and 132, Raman amplification pumping light sources 151-1 to 151-6, input/output devices 203-1 to 203-2, optical isolators 261-1 to 261-2, multi-channel optical amplifiers 121-1 to 121-2, and optical isolators 262-1 to 262-2. As shown in FIG. 16, one amplification device 123 includes the multi-channel optical amplifier 121-1 and the optical isolators 261-1 and 262-1 in one casing.

The input/output device 202-1 splits light of the optical transmission paths 101-1 to 101-4 transmitted through each core of the multicore optical fiber 171-1. The wavelength multiplexers 131-1 and 131-2 multiplex Raman amplification pumping light from Raman amplification pumping light sources 151-1 and 151-2 into light of the optical transmission paths 101-1 and 101-2, respectively.

The input/output device 202-2 splits light of the optical transmission paths 101-5 to 101-8 transmitted through each core of the multicore optical fiber 171-2. The wavelength multiplexers 131-3 and 131-4 multiplex Raman amplification pumping light from Raman amplification pumping light sources 151-3 and 151-4 into light of the optical transmission paths 101-5 and 101-7, respectively.

The wavelength multiplexer 132 multiplexes Raman amplification pumping light from the Raman amplification pumping light sources 151-5 and 151-6 that has been spatially multiplexed by the input/output device 201 into light of each core of the multicore optical fiber 171-3. The input/output device 202-3 splits light transmitted through each core of the multicore optical fiber 171-3 into individual optical transmission paths 101-9 to 101-12.

The input/output device 203-*i* (here, i=1, 2) inserts the light of the optical transmission paths 101-(6*i*-5) to 101-6*i* to each core of the multicore optical fiber each having six or more cores. The optical isolator 261-*i* has a function of transmitting light of the optical transmission paths 101-(6*i*-5) to 101-6*i* only in the direction of the multi-channel optical amplifier 121-*i*. The multi-channel optical amplifier 121-*i* amplifies light transmitted through the optical transmission paths 101-(6*i*-5) to 101-6*i*. The optical isolator 262-*i* outputs the light of the optical transmission paths 101-(6*i*-5) to 101-6*i* that has been amplified by the multi-channel optical amplifier 121-*i* in the same direction as the direction of the optical isolator 261-*i*.

As described above, the seventh embodiment provides an optical transmission system in which a plurality of multicore optical fibers 171-1 to 171-3 are aligned in parallel, and a plurality of multi-channel optical amplifiers of simultaneous pumping are used in parallel. In addition, the induced Raman scattering system shown in the fourth embodiment (FIG. 11) is applied to the multicore optical fibers 171-1 and 171-2, and the induced Raman scattering system shown in the second embodiment (FIG. 6) is applied to the multicore optical fiber 171-3. In this way, the present invention can be applied to an optical transmission system using any optical fiber and a simultaneous pumping optical amplifier, and a plurality of the embodiments described above may be combined.

Eighth Embodiment

An eighth embodiment provides an optically amplified repeater system in which the intensity of light after amplification using a multi-channel optical amplifier is measured for each optical transmission path, and a Raman amplification amount by Raman amplification pumping light is set for each optical transmission path in accordance with a measured value. The eighth embodiment will be described with differences from the embodiments described above focused on.

Figure 17:
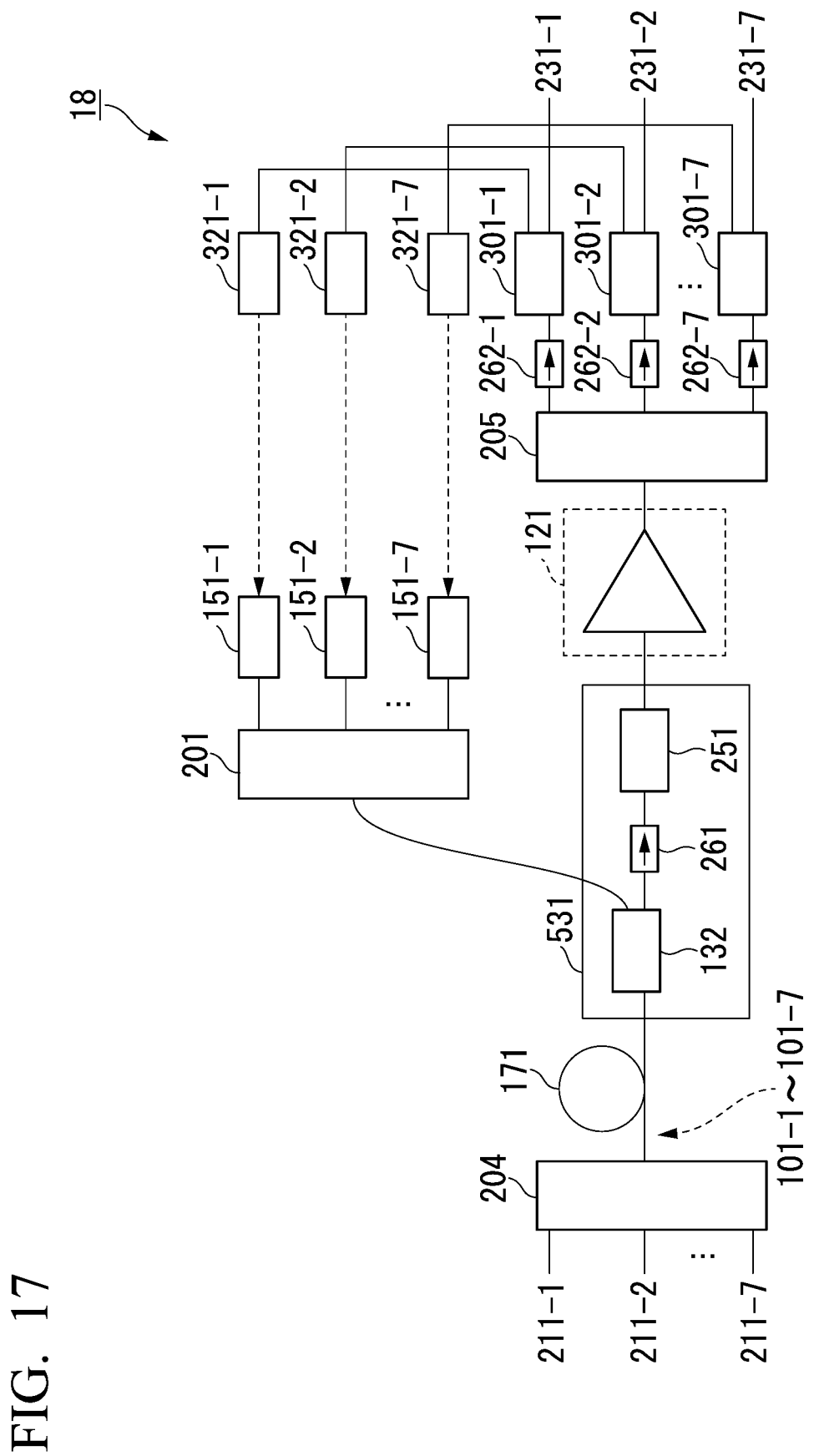
FIG. 17 is a schematic configuration diagram of a large-capacity optically amplified repeater system according to an eighth embodiment.

FIG. 17 is a schematic configuration diagram of a large-capacity optically amplified repeater system 18 according to the eighth embodiment of the present invention. The large-capacity optically amplified repeater system 18 includes an input/output device 204, a multicore optical fiber 171, a wavelength multiplexer 132, Raman amplification pumping light sources 151-1 to 151-N, an input/output device 201, an optical isolator 261, a variable optical attenuator 251, a multi-channel optical amplifier 121, an input/output device 205, optical isolators 262-1 to 262-N, optical taps 301-1 to 301-N, and optical measurement devices 321-1 to 321-N. FIG. 17 shows a case of N=7 as an example. The wavelength multiplexer 132, the optical isolator 261, and the variable optical attenuator 251 may be included in a large-capacity optical amplification optical device 531.

The input/output device 204 is a fan-in/fan-out input/output device and inputs light of optical transmission paths 101-1 to 101-N from input ports 211-1 to 211-N and inserts the input light to each core of a multicore optical fiber 171. Raman amplification pumping light from the Raman amplification pumping light sources 151-1 to 151-N is input to the wavelength multiplexer 132 through the input/output device 201. The wavelength multiplexer 132 multiplexes the Raman amplification pumping light from the Raman amplification pumping light sources 151-1 to 151-N into light of each core of the multicore optical fiber 171. The light transmitted through each core of the multicore optical fiber 171 passes through the optical isolator 261 and is attenuated by the variable optical attenuator 251 simultaneously. The multi-channel optical amplifier 121 amplifies the light of the optical transmission paths 101-1 to 101-N simultaneously. The input/output device 205 that is a fan-in/fan-out input/output device branches light of the optical transmission paths 101-1 to 101-N and outputs the light to output ports 231-1 to 231-N. The light of the optical transmission path 101-*n* (here, n is an integer that is equal to or larger than "1" and is equal to or smaller than N) output from the input/output device 205 passes through the optical isolator 262-*n* and branches in accordance with the optical tap 301-*n*. The optical measurement device 321-*n* measures a light intensity of light branched by the optical tap 301-*n*.

As described above, in the eighth embodiment, the optical taps 301-1 to 301-N are included on optical paths of the optical transmission paths 101-1 to 101-N, respectively, and light intensities of branching light branched by these optical taps 301-1 to 301-N are measured by the optical measurement devices 321-1 to 321-N. Raman amplification amounts using the Raman amplification pumping light sources 151-1 to 151-N are set in accordance with the measured values. The Raman amplification pumping light sources 151-1 to 151-N may output Raman amplification pumping light having light intensities according to the measured values of the optical transmission path. In addition, on the basis of the measured value of each optical transmission path, a Raman amplification pumping light source to output Raman amplification pumping light may be selected from among the Raman amplification pumping light sources 151-1 to 151-N.

The setting of Raman amplification amounts according to the measured values, for example, may be performed by any device such as the optical measurement devices 321-1 to 321-N, an external control device, or the like or may be performed by a user. In a case in which the setting of Raman amplification amounts is performed by a control device, the control device may calculate differences between measured values of the light intensity and a reference value of the light intensity and control light intensities of Raman amplification pumping light output from the Raman amplification pumping light sources 151-1 to 151-N such that amplification amounts compensating for the calculated differences are acquired. By including such a monitoring function/feedback function, the present invention can be easily applied to an arbitrary system.

Ninth Embodiment

In a ninth embodiment, a light intensity after Raman amplification of light transmitted through each optical transmission path is measured, and a Raman amplification amount by Raman amplification pumping light is set for each optical transmission path in accordance with the measured value. The ninth embodiment will be described with differences from the embodiments described above focused on.

Figure 18:
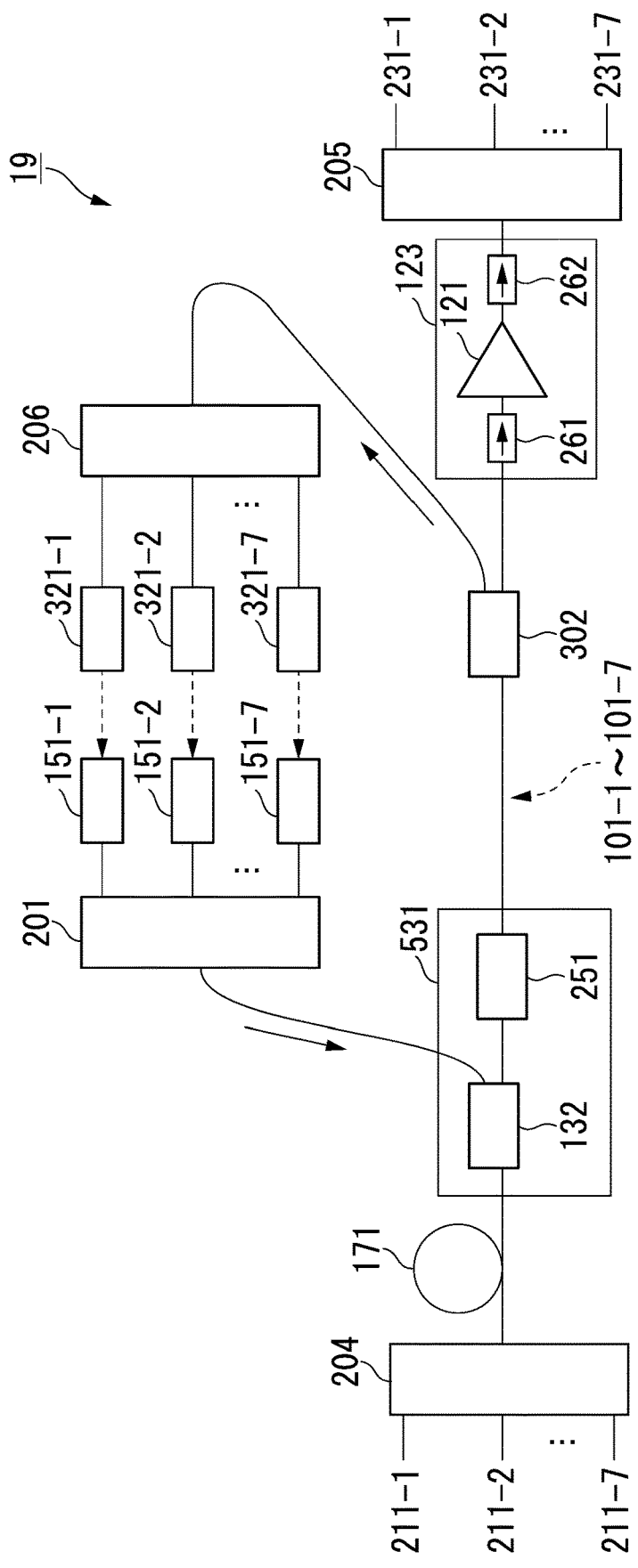
FIG. 18 is a schematic configuration diagram of a large-capacity optically amplified repeater system according to a ninth embodiment.

FIG. 18 is a schematic configuration diagram of a large-capacity optically amplified repeater system 19 according to the ninth embodiment of the present invention. The large-capacity optically amplified repeater system 19 includes an input/output device 204, a multicore optical fiber 171, Raman amplification pumping light sources 151-1 to 151-N, an input/output device 201, a wavelength multiplexer 132, a variable optical attenuator 251, an optical tap 302, an optical isolator 261, a multi-channel optical amplifier 121, an optical isolator 262, an input/output device 205, an input/output device 206, and optical measurement devices 321-1 to 321-N. FIG. 18 shows a case of N=7 as an example. The wavelength multiplexer 132 and the variable optical attenuator 251 may be included in a large-capacity optical amplification optical device 531. In addition, one amplification device 123 includes the multi-channel optical amplifier 121 and the optical isolators 261 and 262 in one casing.

The input/output device 204 inputs light transmitted through optical transmission paths 101-1 to 101-N from input ports 211-1 to 211-N and inserts the light to each core of the multicore optical fiber 171. Raman amplification pumping light from the Raman amplification pumping light sources 151-1 to 151-N is input to the wavelength multiplexer 132 through the input/output device 201. The wavelength multiplexer 132 multiplexes the Raman amplification pumping light from the Raman amplification pumping light sources 151-1 to 151-N into light of each core of the multicore optical fiber 171 to perform Raman amplification on the light of each core.

The light transmitted through each core of the multicore optical fiber 171, after Raman amplification, is attenuated by the variable optical attenuator 251 simultaneously. The optical isolator 261 outputs light of the optical transmission paths 101-1 to 101-N transmitted through each core of the multicore optical fiber toward the multi-channel optical amplifier 121. The multi-channel optical amplifier 121 amplifies light transmitted through the optical transmission paths 101-1 to 101-N simultaneously. The optical isolator 262 passes light of the optical transmission paths 101-1 to 101-N amplified by the multi-channel optical amplifier 121 toward the input/output device 205. The input/output device 205 branches the light of the optical transmission paths 101-1 to 101-N and outputs the light to output ports 231-1 to 231-N.

The optical tap 302 is an N-channel integration-type optical tap and taps light of the optical transmission paths 101-1 to 101-N transmitted through N cores after attenuation using the variable optical attenuator 251. The input/output device 206 that is a fan-in/fan-out input/output device spatially splits branching light corresponding to N cores branched by the optical tap 302. The optical measurement devices 321-1 to 321-N measure light intensities of branching light of each of the optical transmission paths 101-1 to 101-N. In accordance with the measured values, Raman amplification amounts using the Raman amplification pumping light sources 151-1 to 151-N are set. The setting of Raman amplification amounts according to the measured values, similar to the eighth embodiment, may be performed by any device such as the optical measurement devices 321-1 to 321-N, an external control device, or the like or may be performed by a user. By including such a monitoring function/feedback function, the present invention can be easily applied to any system.

Tenth Embodiment

In all the embodiments described, although back Raman scattering in which, after transmission using an optical fiber, Raman amplification pumping light is input in a direction opposite to a direction in which an optical signal propagates is used, a similar effect can be acquired also in a case in which front Raman scattering is used. The tenth embodiment will be described with differences from the embodiments described above focused on.

Figure 19:
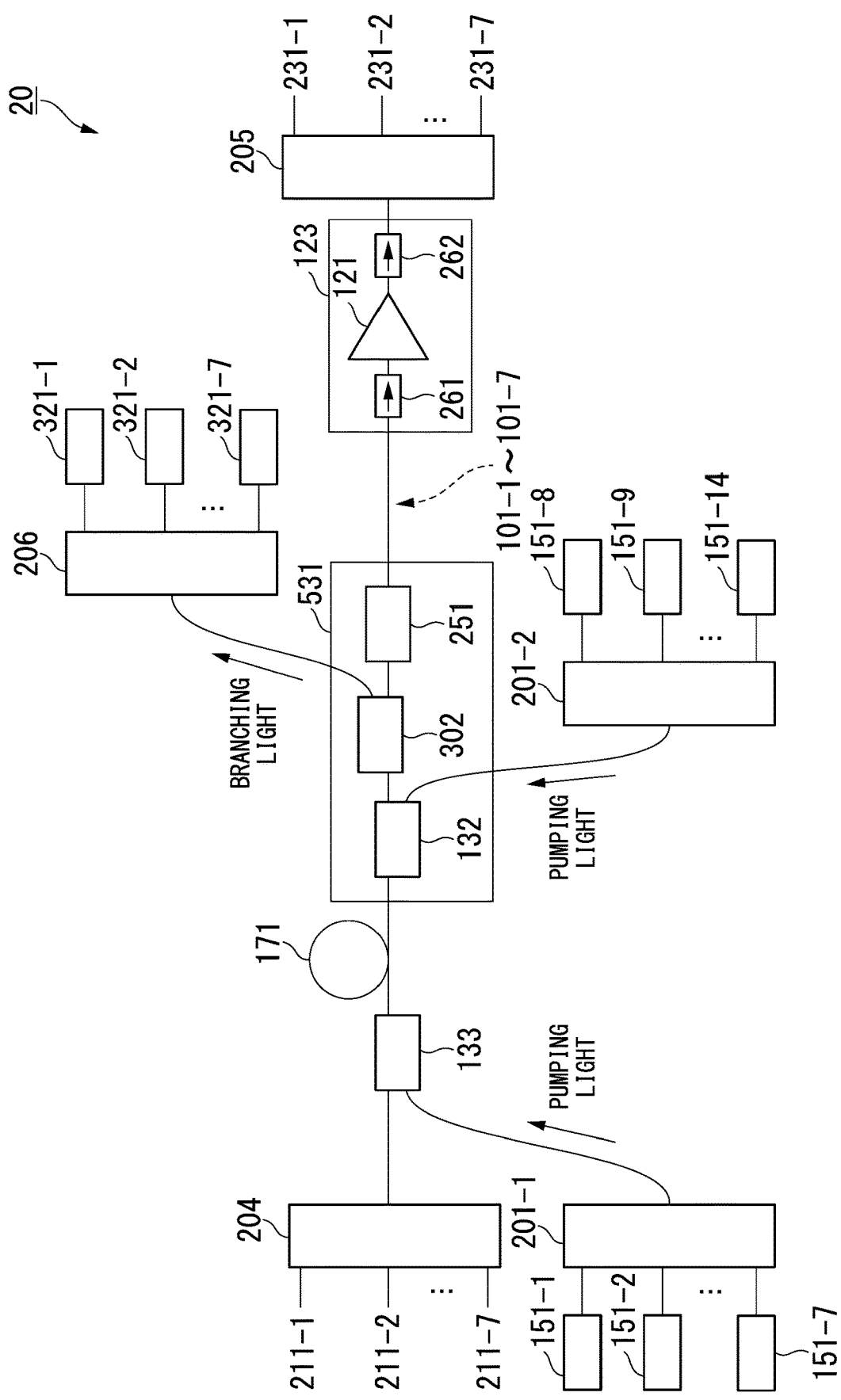
FIG. 19 is a schematic configuration diagram of a large-capacity optically amplified repeater system according to a tenth embodiment.

FIG. 19 is a schematic configuration diagram of a large-capacity optically amplified repeater system 20 according to the tenth embodiment. In the tenth embodiment, front Raman scattering using Raman amplification pumping light sources 151-1 to 151-N and back Raman scattering using Raman amplification pumping light sources 151-(N+1) to 151-2N are performed to amplify light. The large-capacity optically amplified repeater system 20 includes an optical tap 302 that is an integration-type optical tap of N=7 channels provided on optical paths of optical transmission paths 101-1 to 101-N and optical measurement devices 321-1 to 321-N that are optical monitors to monitor branching light according to the optical tap 302. The wavelength multiplexer 132, the optical tap 302, and the variable optical attenuator 251 may be included in a large-capacity optical amplification optical device 531. In addition, as shown in FIG. 19, the multi-channel optical amplifier 121 and the optical isolators 261 and 262 are included in one casing and configure one amplification device 123.

The input/output device 204 inputs light transmitted through optical transmission paths 101-1 to 101-N from input ports 211-1 to 211-N and inserts the light to each core of the multicore optical fiber 171. Raman amplification pumping light from the Raman amplification pumping light sources 151-1 to 151-N is input to the wavelength multiplexer 133 through the input/output device 201-1. The wavelength multiplexer 133 multiplexes the Raman amplification pumping light from the Raman amplification pumping light sources 151-1 to 151-N into light of each core of the multicore optical fiber 171 for front Raman scatting.

Raman amplification pumping light from the Raman amplification pumping light sources 151-(N+1) to 151-2N is input to the wavelength multiplexer 132 through the input/output device 201-2. The wavelength multiplexer 132 multiplexes the Raman amplification pumping light from the Raman amplification pumping light sources 151-(N+1) to 151-2N into light of each core of the multicore optical fiber 171 for back Raman scatting.

The optical tap 302 taps light of the optical transmission paths 101-1 to 101-N that is transmitted through N cores of the multicore optical fiber 171. The input/output device 206 spatially splits branching light corresponding to N cores branched by the optical tap 302. The optical measurement devices 321-1 to 321-N measure light intensities of branching light of the separated optical transmission paths 101-1 to 101-N. The variable optical attenuator 251 attenuates light transmitted through each core of the multicore optical fiber 171 together. The optical isolator 261, the multi-channel optical amplifier 121, the optical isolator 262, and the input/output device 205 operate similar to the large-capacity optically amplified repeater system 19 according to the ninth embodiment. Similar to the eighth and ninth embodiments, the optical intensities of the Raman amplification pumping light output from the Raman amplification pumping light sources 151-1 to 151-2N may be set by a user in accordance with measured values measured by the optical measurement devices 321-1 to 321-N. Also, using automatic feedback, the optical intensities of the Raman amplification pumping light output from the Raman amplification pumping light sources 151-1 to 151-2N may be adjusted in accordance with the measured values.

Eleventh Embodiment

An eleventh embodiment shows a large-capacity optical amplifier in a large-capacity optically amplified repeater system.

Figure 20:
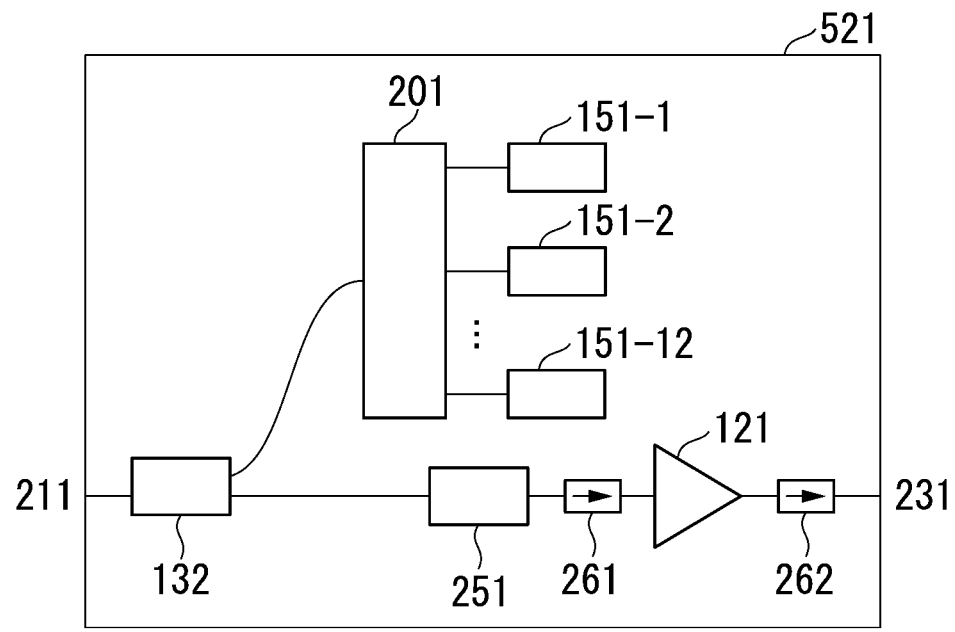
FIG. 20 is a schematic configuration diagram of a large-capacity optical amplifier according to an eleventh embodiment.

FIG. 20 is a schematic configuration diagram of a large-capacity optical amplifier 521 according to the eleventh embodiment of the present invention. The large-capacity optical amplifier 521 has a configuration in which the wavelength multiplexer 132, the Raman amplification pumping light sources 151-1 to 151-N, the input/output device 201, the variable optical attenuator 251, the optical isolator 261, the multi-channel optical amplifier 121, and the optical isolator 262 according to the embodiment described above are housed in one casing. The large-capacity optical amplifier 521 is appropriate for a large-capacity optically amplified repeater system. FIG. 20 shows a case of N=12 as an example.

As shown in FIG. 20, the large-capacity optical amplifier 521 includes an input port 211 having at least N cores connected to a plurality of optical transmission path and an output port 231 having at least N cores outputting light amplified by the multi-channel optical amplifier 121. In addition, the large-capacity optical amplifier 521 may include at least N input ports 211-1 to 211-N connected to a plurality of optical transmission paths, respectively, and at least N output ports 231-1 to 231-N outputting light amplified by the multi-channel optical amplifier 121.

Figure 21:
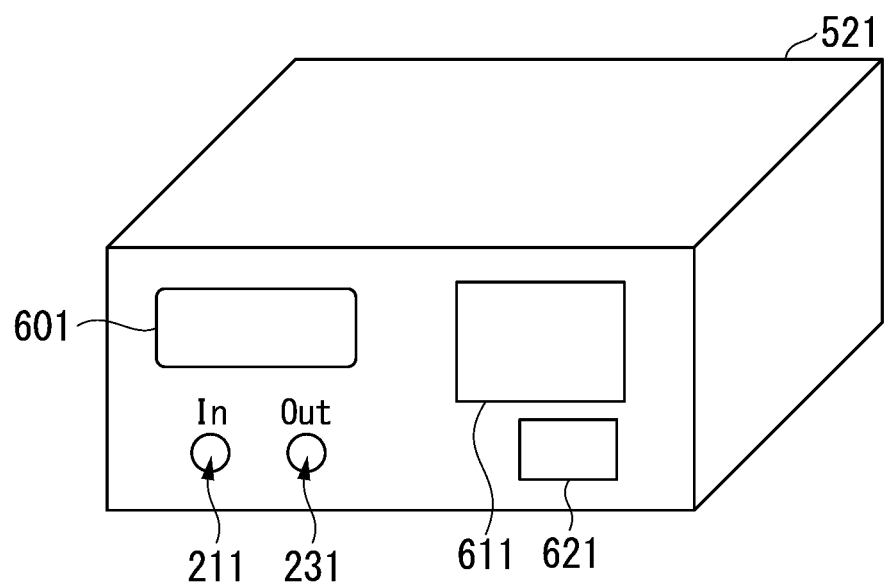
FIG. 21 is a diagram showing an external view of a large-capacity optical amplifier according to the eleventh embodiment.

FIG. 21 is a diagram showing an external view of the large-capacity optical amplifier 521. The casing of the large-capacity optical amplifier 521 includes a display screen 601, an operation panel 611 that inputs a user operation to the large-capacity optical amplifier 521, a power switch 621, an input port 211 having N cores, and an output port 231 having N cores.

Figure 22:
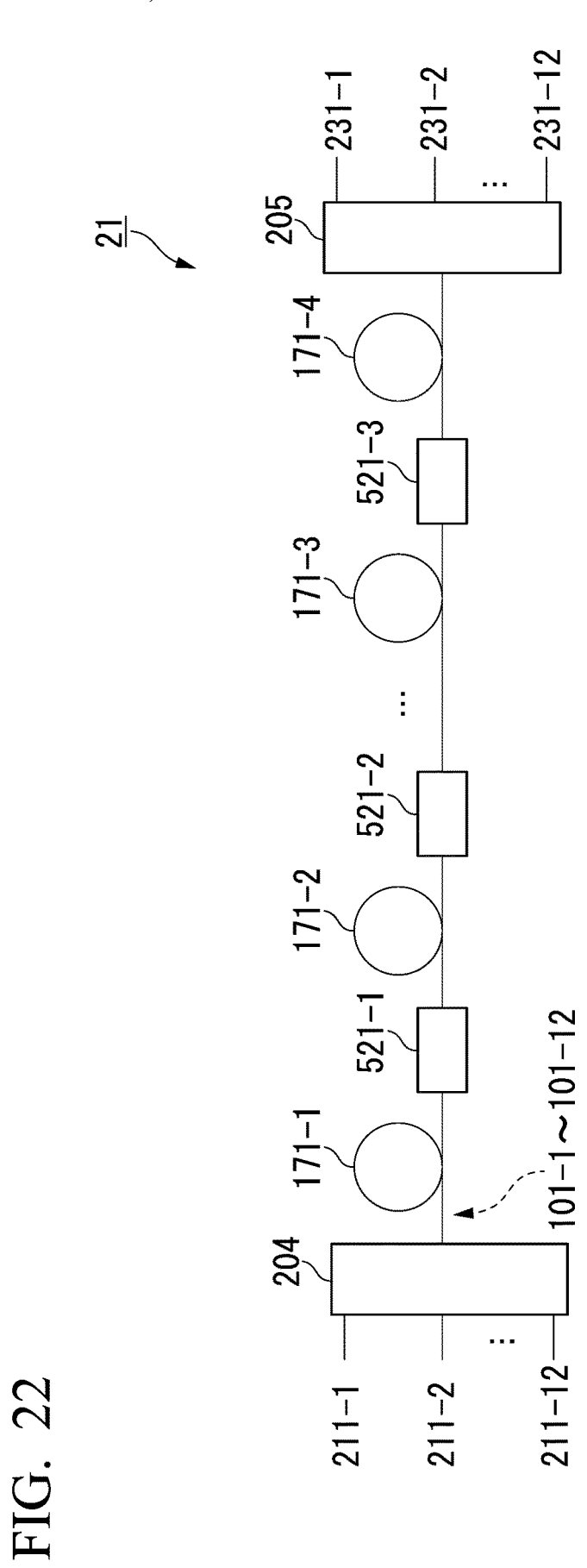
FIG. 22 is a schematic configuration diagram of a large-capacity optically amplified repeater system according to the eleventh embodiment.

FIG. 22 is a diagram showing an example of a large-capacity optically amplified repeater system 21 to which the large-capacity optical amplifier 521 according to the eleventh embodiment is applied. As shown in FIG. 22, the large-capacity optically amplified repeater system 21 uses multicore optical fibers 171-1 to 171-P and large-capacity optical amplifiers 521-1 to 521-Q. P and Q are integers equal to or larger than "1", and FIG. 22 shows a case of P=4 and Q=3 as an example. The input/output device 204 inserts light transmitted through the optical transmission paths 101-1 to 101-N to each core of the multicore optical fiber 171-1. FIG. 22 shows a case of N=12 as an example. The light of each core is propagated through the multicore optical fiber 171-1 and then amplified by the large-capacity optical amplifier 521-1. Thereafter, amplification of the light of each core propagated through the multicore optical fiber 171-$p$ using a large-capacity optical amplifier 521-$q$ of a later stage is sequentially repeated, where p is an integer that is equal to or larger than "1" and equal to or smaller than P and q is an integer that is equal to or larger than "1" and is equal to or smaller than Q. The input/output device 205 outputs light of each core of the multicore optical fiber 171-P to the output ports 231-1 to 231-N.

In this way, by configuring the function used by the present invention as a device, an optically amplified repeater system disclosed in the present invention can be easily realized.

Twelfth Embodiment

A twelfth embodiment shows one example of an optical communication system to which the large-capacity optically amplified repeater system and the optical amplifier disclosed in the first to eleventh embodiments are applied.

Figure 23:
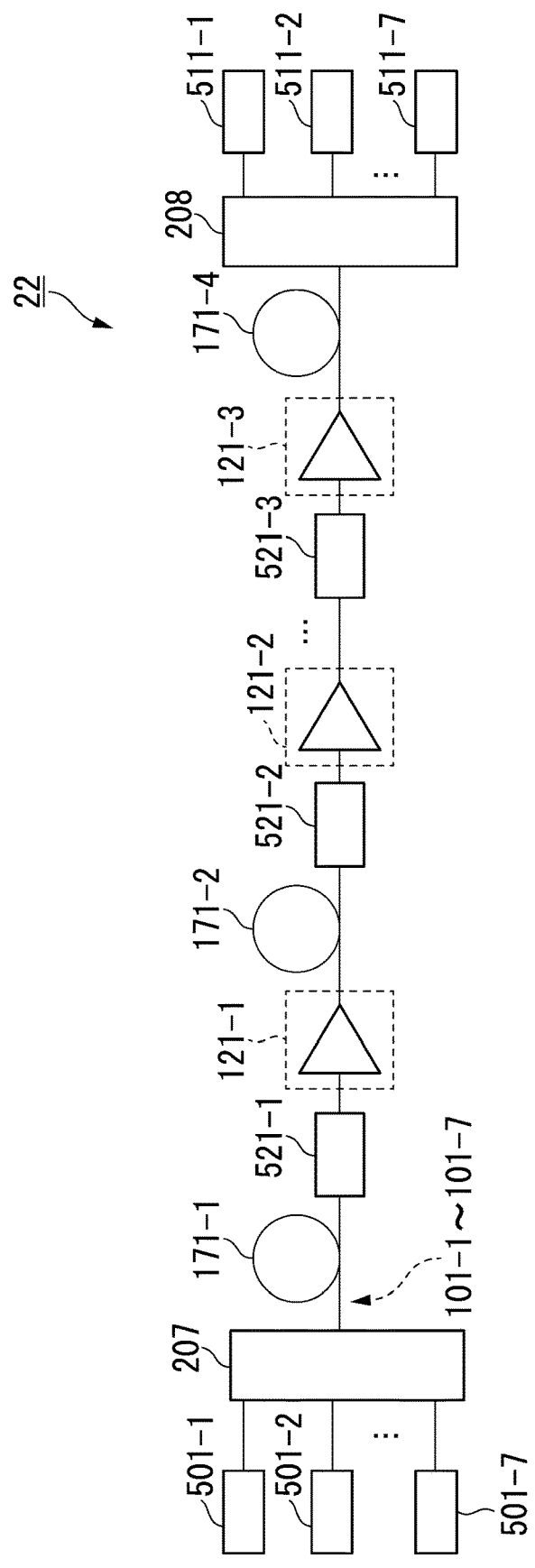
FIG. 23 is a schematic configuration diagram of a large-capacity optically amplified repeater system according to a twelfth embodiment.

FIG. 23 is a schematic configuration diagram of an optical communication system 22 according to the twelfth embodiment of the present invention. The optical communication system 22 includes multicore optical fibers 171-1 to 171-P, large-capacity optical amplifiers 521-1 to 521-Q, and multi-channel optical amplifiers 121-1 to 121-Q. In addition, the optical communication system 22 includes optical transmitters 501-1 to 501-N and a spatial multiplexing light multiplexer 207 at a transmission end and includes a spatial multiplexing light demultiplexer 208 and optical receivers 511-1 to 511-N at a reception end. FIG. 23 shows a case in which P=4, Q=3, and N=7 as an example. In addition, an amplification device 123 may be used instead of all or some of the multi-channel optical amplifiers 121-1 to 121-Q. Furthermore, as in a case of P=3 and Q=4, Q may be larger than P, and P=Q may be satisfied.

The spatial multiplexing light multiplexer 207 outputs light of the optical transmission paths 101-1 to 101-N output from the optical transmitters 501-1 to 501-N to each core of the multicore optical fiber 171-1. Thereafter, amplification of the light propagated through each core of the multicore optical fiber 171-$p$ using a large-capacity optical amplifier 521-$q$ and the multi-channel optical amplifier 121-$q$ that are provided in a later stage is sequentially repeated, where p is an integer that is equal to or larger than "1" and is equal to or smaller than P, and q is an integer that is equal to or larger than "1" and is equal to or smaller than Q. The spatial multiplexing light demultiplexer 208 branches light of each core of the multicore optical fiber 171-P and outputs the light to the optical receivers 511-1 to 511-N.

In this way, transmission signals of the optical transmission paths 101-1 to 101-N are transmitted through a basic unit a plurality of number of times, wherein the basic unit includes the multicore optical fiber 171, the large-capacity optical amplifier 521, and the multi-channel optical amplifier 121. After the transmissions through the basic units, the transmission signals are passed through the multicore optical fiber 171 and then received. FIG. 23 shows a simple example in which the large-capacity optically amplified repeater system and the optical amplifier according to the embodiments described above are applied to a point-to-point optical communication system. Furthermore, the large-capacity optically amplified repeater system and the optical amplifier according to the embodiments described above are also useful for a complex optical communication system having a network topology other than the point-to-point.

Conventionally, in a transmission system using a multicore optical fiber, in order to amplify light of all the cores, simultaneous amplification using a simultaneous pumping system that uses a multicore erbium/ytterbium-doped fiber having a double cladding structure or the like has been proposed. However, since all the cores of the multicore are uniformly excited in the simultaneous pumping system, characteristic differences between optical signals of cores may not be compensated. According to the embodiments described above, signals are amplified through simultaneous pumping after characteristic differences (differences in the optical power level) between optical signals of cores of the multicore optical fiber are compensated through Raman excitation. Accordingly, in a case in which optical amplifiers of simultaneous pumping are used, a large-capacity optically amplified repeater system that resolves characteristic differences between optical transmission paths, prevents degradation of the OSNR, and is appropriate for implementation of a large capacity with low power consumption can be realized.

According to the embodiments described above, an optically amplified repeater system (for example, the large-capacity optically amplified repeater systems 11 to 21 and the optical communication system 22) includes a plurality of optical transmission paths including an optical fiber, a multi-channel optical amplifier (for example, the multi-channel optical amplifier 121), wavelength multiplexers (for example, the wavelength multiplexers 131-1 to 131-N and 132), and Raman amplification pumping light sources (for example, Raman amplification pumping light sources 151-1 to 151-N). The multi-channel optical amplifier is formed from K (here, K is an integer equal to or larger than "1") simultaneous pumping light sources (for example, the simultaneous pumping light source 461), N (Here, N is an integer satisfying relation of N>K) optical amplification media (for example, optical amplification media 471-1 to 471-N), and one or more optical couplers (for example, the optical coupler 451) coupling the light from the simultaneous pumping light source with the optical amplification media. The multi-channel optical amplifier amplifies light intensities of light transmitted through the N optical amplification media by the K simultaneous pumping light sources simultaneously. The wavelength multiplexer multiplexes light having a wavelength different from the wavelength band of the optical signal into at least one optical transmission path among optical transmission paths. The Raman amplification pumping light source outputs Raman amplification pumping light having a wavelength different from the wavelength band of the optical signal. In the optically amplified repeater system, light intensities of the wavelength band of the optical signal is Raman amplified by the Raman amplification pumping light. Amplification amounts on the Raman amplification are set in accordance with characteristic differences of optical signals passing through a plurality of optical transmission paths.

The plurality of optical transmission paths may include multicore optical fibers (for example, the multicore optical fibers 171, 171a, 171b, and 171c) including a plurality of cores. In such a case, the wavelength multiplexer multiplexes light of a wavelength different from the wavelength band of the optical signal in each core of the multicore optical fiber. The multicore optical fibers, the wavelength multiplexer, and the N optical paths of the multi-channel optical amplifiers are interconnected so as to be optically coupled. In addition, the optical tap (for example, the optical tap 302) branching a part of light propagated through each of the plurality of optical transmission paths may be included. Amplification amounts on Raman amplification are set in accordance with optical intensities of light branched by the optical tap.

In addition, the plurality of optical transmission paths may include N optical fibers (for example, the optical fibers 111-1 to 111-N), and optical taps (for example, the optical taps 301-1 to 301-N) branching light propagated through optical paths may be included on the optical paths of the N optical fibers. Amplification amounts on Raman amplification are set in accordance with light intensities of light branched by the optical tap.

In addition, the optically amplified repeater system may include a multi-channel optical amplifier, a wavelength multiplexer, Raman amplification pumping light sources, at least N input ports connected to a plurality of optical transmission paths, and an amplifier (for example, large-capacity optical amplifier 521) including at least N output ports outputting light amplified by the multi-channel optical amplifier. Alternatively, the optically amplified repeater system may include a multi-channel optical amplifier, a wavelength multiplexer, Raman amplification pumping light sources, an input port having at least N cores connected to the plurality of optical transmission paths, and an amplifier having an output port having at least N cores outputting amplified light.

In addition, the optically amplified repeater system may include at least one of the following (1), (2), and (3); (1) an optical amplifier including a multi-channel optical amplifier and a wavelength multiplexer, (2) a first amplifier including a multi-channel optical amplifier, a wavelength multiplexer, a Raman amplification pumping light source, at least N input ports connected to a plurality of optical transmission paths, and at least N output ports outputting light amplified by the multi-channel optical amplifier, and (3) a second amplifier including a multi-channel optical amplifier, a wavelength multiplexer, a Raman amplification pumping light source, an input port having at least N cores connected to optical transmission paths, and an output port having at least N cores outputting amplified light.

According to the embodiments described above, in a large-capacity optically amplified repeater system using a multi-channel optical amplifier that can amplify optical intensities of a plurality of optical transmission paths together, characteristic deviations between the plurality of optical transmission paths can be reduced, and an optically amplified repeater system having excellent characteristics is realized.

In addition, the aspect described above represents one aspect of the present invention, the present invention is not limited to the embodiments described above, and it is apparent that changes and improvements within a range in which components of the present invention are included, and the object and the effect can be achieved belong to the scope of the present invention. In addition, a specific structure, a shape, and the like when the present invention is performed may be a different structure, a different shape, and the like within a range in which the object and the effect of the present invention can be achieved. The present invention is not limited to the embodiments described above, and changes and improvements within a range in which the object of the present invention can be achieved belong to the present invention.

INDUSTRIAL APPLICABILITY

The present invention can be applied to a use in which optical amplification alleviating characteristic deviations among a plurality of optical transmission paths and having high efficiency is required.

REFERENCE SIGNS LIST 11, 12, 13, 14, 15, 16, 17, 18, 19, 20, 21 Large-capacity optically amplified repeater system
22 Optical communication system
101-1 to 101-12 Optical transmission path
111-1 to 111-7 Optical fibers
121, 121-1 to 121-2 Multi-channel optical amplifier
123 Amplification device
131-1 to 131-7 Wavelength multiplexer
132, 132-1 to 132-3 Wavelength multiplexer
151-1 to 151-14 Raman amplification pumping light source
171, 171-1 to 171-4, 171a, 171b, 171c Multicore optical fiber
200 Optical device
201, 201-1 to 201-3, 202, 202-1 to 202-3, 203, 204, 205, 206 Input/output device
207 Spatial multiplexing light multiplexer
208 Spatial multiplexing light demultiplexer
211-1 to 211-12 Input port
231-1 to 231-12 Output port
251 Variable optical attenuator
261, 261-1 to 261-7, 262, 262-1 to 262-7 Optical isolator 301-1 to 301-7, 302 Optical tap
321-1 to 321-7 Optical measurement device
401-1 to 401-19 Core
421 Cladding
431 Coating
441 Marker
451, 451-1, 451-2 Optical coupler
461, 461-1, 461-2 Simultaneous pumping light source
471-1 to 471-12 Optical amplification media
501-1 to 501-7 Optical transmitter
511-1 to 511-7 Optical receiver
521, 521-1 to 521-3 Large-capacity optical amplifier
531 Large-capacity optical amplification optical device
601 Display screen
611 Operation panel
621 Power switch

The invention claimed is:

1. An optically amplified repeater system comprising:
optical transmission paths that include optical fibers;
a multi-channel optical amplifier comprising K simultaneous pumping light sources, N optical amplification media, and one or more optical couplers that couples light output from the K simultaneous pumping light sources to the N optical amplification media, N being an integer equal to or larger than "1", K being an integer equal to or larger than "1" and satisfying relation N>K, wherein, with the K simultaneous pumping light sources, the multi-channel optical amplifier simultaneously amplifies light intensities of optical signals that pass through the N optical amplification media and propagate through the optical transmission paths;
one or more Raman amplification pumping light sources that output Raman amplification pumping light having a wavelength different from a wavelength band of the optical signals; and
a wavelength multiplexer that multiplexes the Raman amplification pumping light having a wavelength different from the wavelength band of the optical signals into at least one optical transmission path among the optical transmission paths,
wherein light intensities of the wavelength band of the optical signals is Raman amplified by the Raman amplification pumping light, and
wherein the Raman amplification is applied to (N−1) or less optical transmission paths other than an optical transmission path having the best transmission characteristics among a plurality of optical transmission paths, and
wherein a light intensity of the Raman amplification pumping light output from the one or more Raman amplification pumping light sources is determined in accordance with characteristic differences between the optical signals passing through the optical transmission paths to which the Raman amplification is applied.

2. The optically amplified repeater system according to claim 1,
wherein the optical transmission paths comprise a multi-core optical fiber having a plurality of cores.

3. The optically amplified repeater system according to claim 2,
wherein the wavelength multiplexer multiplexes the Raman amplification pumping light having a wavelength different from the wavelength band of the optical signals into each of the plurality of cores of the multicore optical fiber, and
wherein the multicore optical fiber, the wavelength multiplexer, and N optical paths of the multi-channel optical amplifier are interconnected so as to be optically coupled.

4. The optically amplified repeater system according to claim 3, further comprising an optical tap that branches the optical signals propagating through the optical transmission paths,
wherein the light intensity of the Raman amplification pumping light output from the one or more Raman amplification pumping light sources is determined in accordance with light intensities of the optical signals branched by the optical tap.

5. The optically amplified repeater system according to claim 1, wherein the optical transmission paths include N optical fibers, and each of the N optical fibers is equipped with an optical tap that branches the optical signals propagating through the optical transmission paths, and
wherein the light intensity of the Raman amplification pumping light output from the one or more Raman amplification pumping light sources is determined in accordance with light intensities of the optical signals branched by the optical taps.

6. The optically amplified repeater system according to claim 1, further comprising an amplifier including:
the multi-channel optical amplifier;
the wavelength multiplexer;
the one or more Raman amplification pumping light sources;
at least N input ports connected to the optical transmission paths; and
at least N output ports outputting the optical signals amplified by the multi-channel optical amplifier.

7. The optically amplified repeater system according to claim 1, further comprising an amplifier including:
the multi-channel optical amplifier;
the wavelength multiplexer;
the one or more Raman amplification pumping light sources;
an input port having at least N cores connected to the optical transmission paths; and
an output port having at least N cores outputting the optical signals amplified by the multi-channel optical amplifier.

8. The optically amplified repeater system according to claim 1, further comprising at least one of:
an optical amplifier including the multi-channel optical amplifier and the wavelength multiplexer; and
a first amplifier including the multi-channel optical amplifier, the wavelength multiplexer, the one or more Raman amplification pumping light sources, at least N input ports connected to the optical transmission paths, and at least N output ports outputting the optical signals amplified by the multi-channel optical amplifier.

9. An optical amplifier connecting to optical transmission paths that include optical fibers, the optical amplifier comprising:
a multi-channel optical amplifier that simultaneously amplifies light intensities of optical signals propagating through the optical transmission paths;
one or more Raman amplification pumping light sources that output Raman amplification pumping light having a wavelength other than a wavelength band of the optical signals; and a wavelength multiplexer that multiplexes the Raman amplification pumping light into at least one optical transmission path among the optical transmission paths, wherein a light intensity of a wavelength band of an optical signal is Raman amplified by the Raman amplification pumping light, the optical signal being propagated through at least one optical transmission path in which the Raman amplification pumping light is multiplexed, wherein the Raman amplification is applied to (N−1) or less optical transmission paths other than an optical transmission path having the best transmission characteristics among a plurality of optical transmission paths, and wherein the one or more Raman amplification pumping light sources output the Raman amplification pumping light having light intensity in accordance with characteristic differences between the optical signals passing through the optical transmission paths to which the Raman amplification is applied.

10. An optical amplifier connecting to optical transmission paths that include optical fibers, and which connects to a multi-channel optical amplifier that simultaneously amplifies light intensities of optical signals propagating through the optical transmission paths, the optical amplifier comprising:

one or more Raman amplification pumping light sources that output Raman amplification pumping light having a wavelength other than a wavelength band of the optical signals; and a wavelength multiplexer that multiplexes the Raman amplification pumping light into at least one optical transmission path among the optical transmission paths, wherein a light intensity of a wavelength band of an optical signal is Raman amplified by the Raman amplification pumping light, the optical signal being propagated through at least one optical transmission path in which the Raman amplification pumping light is multiplexed, wherein the Raman amplification is applied to (N−1) or less optical transmission paths other than an optical transmission path having the best transmission characteristics among a plurality of optical transmission paths, and wherein the one or more Raman amplification pumping light sources output the Raman amplification pumping light having light intensity in accordance with characteristic differences between the optical signals passing through the optical transmission paths to which the Raman amplification is applied.

11. The optically amplified repeater system according to claim 3, further comprising:

a second amplifier including the multi-channel optical amplifier, the wavelength multiplexer, the one or more Raman amplification pumping light sources, an input port having at least N cores each of which connected to one of the optical transmission paths, and an output port having at least N cores each of which outputting one of the optical signals amplified by the multi-channel optical amplifier.

* * * * *